United States Patent
Aasheim et al.

(10) Patent No.: US 7,178,061 B2
(45) Date of Patent: *Feb. 13, 2007

(54) POWER FAILURE DETECTION AND CORRECTION IN A FLASH MEMORY DEVICE

(75) Inventors: Jered Donald Aasheim, Bellevue, WA (US); Yongqi Yang, Bellevue, WA (US); John Kalkman, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 614 days.

This patent is subject to a terminal disclaimer.

(21) Appl. No.: 10/301,535

(22) Filed: Nov. 21, 2002

(65) Prior Publication Data

US 2004/0078666 A1    Apr. 22, 2004

Related U.S. Application Data

(63) Continuation-in-part of application No. 10/087,672, filed on Feb. 27, 2002.

(51) Int. Cl.
    *G06F 11/00*    (2006.01)
(52) U.S. Cl. .............................. 714/24; 714/14; 714/36; 711/103
(58) Field of Classification Search ................. 714/14, 714/24, 36; 711/103
    See application file for complete search history.

(56) References Cited

U.S. PATENT DOCUMENTS

| 4,815,028 A | 3/1989 | Saitoh |
| 5,123,104 A | 6/1992 | Levine et al. |
| 5,124,987 A | 6/1992 | Milligan et al. |
| 5,475,827 A | 12/1995 | Lee et al. |
| 5,530,828 A | 6/1996 | Kaki et al. |
| 5,598,370 A | 1/1997 | Niijima et al. |
| 5,627,533 A | 5/1997 | Clark |
| 5,630,093 A | 5/1997 | Holzhammer et al. |
| 5,634,050 A | 5/1997 | Krueger et al. |
| 5,663,901 A | 9/1997 | Wallace et al. |
| 5,682,497 A | 10/1997 | Robinson |
| 5,734,816 A | 3/1998 | Niijima et al. |
| 5,742,818 A | 4/1998 | Shoroff et al. |
| 5,742,934 A | 4/1998 | Shinohara |

(Continued)

FOREIGN PATENT DOCUMENTS

GB    2 291 991    2/1996

(Continued)

*Primary Examiner*—Robert Beausoliel
*Assistant Examiner*—Christopher McCarthy
(74) *Attorney, Agent, or Firm*—Lee & Hayes, PLLC

(57) ABSTRACT

A transactional file system developed to function with flash memory is described. The file system performs power-failure detection and ensures data integrity in the event of a power failure. In one described implementation, a power failure event can be detected by a file system, components of the file system, or individual modules in the form or computer-executable instructions and/or logic. Meta-information is stored at a location on a flash medium indicated by a write pointer if a computer device shuts-down according to a normal shutdown mode. During initialization of the computer, a check is performed whether the meta-information is present in the location on the flash medium indicated by the write pointer. If the meta-information is present, then a conclusion is made that the computer shutdown according to the normal shutdown mode.

18 Claims, 21 Drawing Sheets

U.S. PATENT DOCUMENTS

| | | |
|---|---|---|
| 5,745,418 A | 4/1998 | Ma et al. |
| 5,799,168 A | 8/1998 | Ban |
| 5,799,305 A | 8/1998 | Bortvedt et al. |
| 5,801,650 A | 9/1998 | Nakayama |
| 5,822,781 A | 10/1998 | Wells et al. |
| 5,867,417 A | 2/1999 | Wallace et al. |
| 5,867,641 A | 2/1999 | Jenett |
| 5,887,198 A | 3/1999 | Houlberg et al. |
| 5,912,848 A | 6/1999 | Bothwell |
| 5,937,425 A | 8/1999 | Ban |
| 5,956,473 A | 9/1999 | Ma et al. |
| 5,960,434 A | 9/1999 | Schimmel |
| 5,973,609 A | 10/1999 | Schoch |
| 5,973,964 A * | 10/1999 | Tobita et al. .......... 365/185.29 |
| 5,974,426 A | 10/1999 | Lee et al. |
| 5,974,546 A * | 10/1999 | Anderson ...................... 713/2 |
| 5,983,240 A | 11/1999 | Shoroff et al. |
| 5,987,563 A | 11/1999 | Itoh et al. |
| 5,991,778 A | 11/1999 | Starek et al. |
| 6,000,006 A | 12/1999 | Bruce et al. |
| 6,009,520 A | 12/1999 | Gharda |
| 6,011,741 A | 1/2000 | Wallace et al. |
| 6,014,724 A | 1/2000 | Jenett |
| 6,061,788 A * | 5/2000 | Reynaud et al. ................ 713/2 |
| 6,070,174 A | 5/2000 | Starek et al. |
| 6,078,999 A | 6/2000 | Raju et al. |
| 6,111,815 A | 8/2000 | Takeda |
| 6,148,349 A | 11/2000 | Chow et al. |
| 6,198,660 B1 | 3/2001 | Rolandi |
| 6,223,284 B1 | 4/2001 | Novoa et al. |
| 6,230,285 B1 * | 5/2001 | Sadowsky et al. ............ 714/14 |
| 6,253,281 B1 | 6/2001 | Hall |
| 6,279,069 B1 | 8/2001 | Robinson et al. |
| 6,336,158 B1 | 1/2002 | Martwick |
| 6,347,051 B2 | 2/2002 | Yamagami et al. |
| 6,377,500 B1 | 4/2002 | Fujimoto et al. |
| 6,415,350 B2 | 7/2002 | Asoh |
| 6,421,792 B1 * | 7/2002 | Cromer et al. ................. 714/36 |
| 6,427,186 B1 | 7/2002 | Lin et al. |
| 6,493,807 B1 | 12/2002 | Martwick |
| 6,510,488 B2 | 1/2003 | Lasser |
| 6,564,285 B1 | 5/2003 | Mills et al. |
| 6,606,707 B1 | 8/2003 | Hirota et al. |
| 6,621,746 B1 * | 9/2003 | Aasheim et al. ....... 365/185.29 |
| 6,628,537 B1 | 9/2003 | Wallace et al. |
| 6,633,956 B1 | 10/2003 | Mitani |
| 6,643,730 B2 | 11/2003 | Okumura et al. |
| 6,839,823 B1 * | 1/2005 | See et al. .................... 711/171 |
| 6,901,499 B2 * | 5/2005 | Aasheim et al. ............ 711/205 |
| 7,076,599 B2 * | 7/2006 | Aasheim et al. ............ 711/103 |
| 2003/0165076 A1 * | 9/2003 | Gorobets et al. ............ 365/200 |
| 2004/0083405 A1 * | 4/2004 | Chang et al. ................. 714/24 |
| 2005/0036387 A1 * | 2/2005 | Seal et al. ................... 365/222 |
| 2005/0138271 A1 * | 6/2005 | Bernstein et al. ........... 711/103 |

FOREIGN PATENT DOCUMENTS

| | | |
|---|---|---|
| JP | 2001142774 A | 5/2001 |
| JP | 2003036204 A | 2/2003 |
| WO | WO 97/37296 | 10/1997 |

* cited by examiner

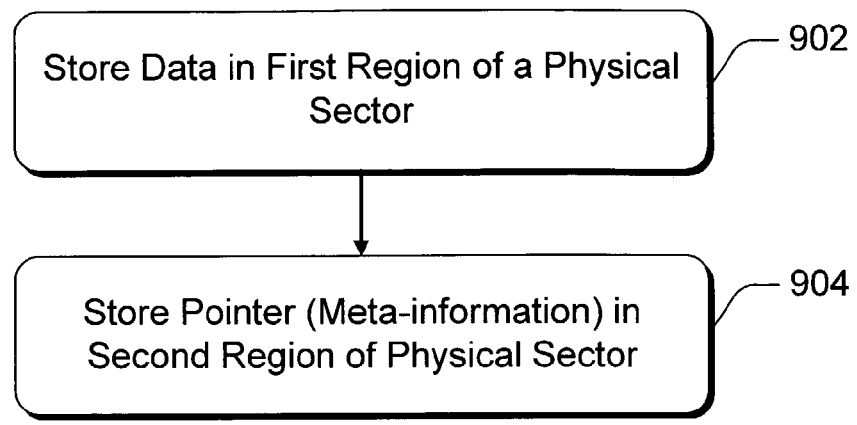
Fig. 9
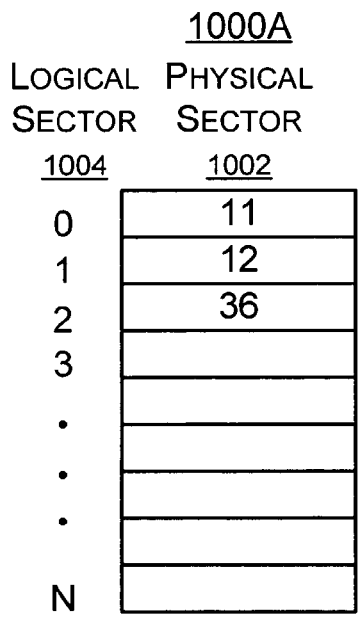
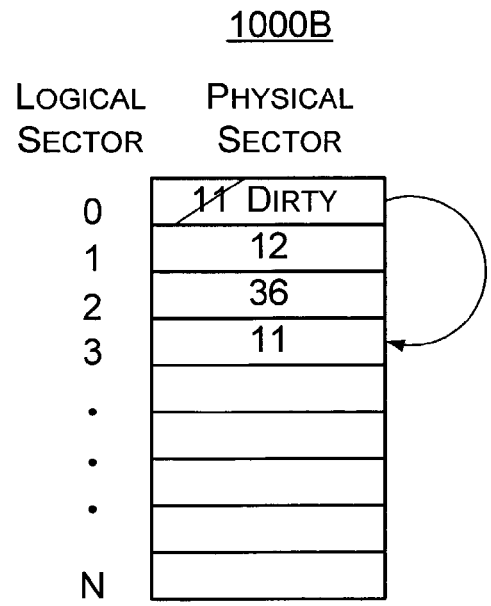
Fig. 10A          Fig. 10B

US 7,178,061 B2

POWER FAILURE DETECTION AND CORRECTION IN A FLASH MEMORY DEVICE

CROSS-REFERENCE TO RELATED APPLICATIONS

The present patent application is a Continuation-In-Part of U.S. patent application Ser. No. 10/087,672, entitled "Open Architecture Flash Driver," by Aasheim, et al., having a filing date of Feb. 27, 2002, and is commonly assigned herewith (hereinafter referred to as "Aasheim '672"). The contents of the aforementioned application are fully incorporated herein by reference.

TECHNICAL FIELD

This invention relates to transactional file systems, and more particularly, to transactional file systems used in conjunction with non-volatile memory devices.

BACKGROUND

A file system is typically used by an operating system or program applications to locate, name, organize and store files. "Files" are named collections of information in many data formats, such as a program, data used by a program application, user-created documents, etc. The file system, itself, consists of files, directories, and information needed to locate and access files. Most file systems include functionality needed to translate requests for files (such as reading and writing data) from application programs into low-level, sector oriented tasks that are understood by a driver and used for communicating with an underlying storage media, such as a hard disk, floppy diskette, Zip drive, flash drive, and so forth.

Most current file systems tend to use rigid architectures that behave the same regardless of the underlying storage medium. Accordingly, to facilitate communication between most file systems and different types of storage media, it is usually necessary to create specific drivers adapted to the particular type or brand of underlying media. Typically, the drivers enable a file system to interface with a particular medium by providing a device-specific control program to communicate with the medium in response to commands received from the file system.

A drawback of current file system architectures is that they tend to incorporate methodologies that were developed decades ago. The file systems were originally intended for use with storage mediums that operate in a stable operating environment, such as mainframe computers and stationary personal computers. However, when used in conjunction with less traditional computer devices, such as thin clients (e.g., personal digital assistants (PDAs), tablet PCs, etc.), wireless handsets, set-top boxes and other non-traditional computer devices, current file systems tend to operate inefficiently. For example, many of the latest computer gadgets tend to be battery-operated and frequently experience catastrophic system failures such as a power-failure event. Unfortunately, current file systems tend to use boot sequencing techniques that were originally intended for use with media found in more traditional computing environments, such as a workstation or personal computer communicating with a hard disk. These boot sequencing techniques tend to be very slow and require an inordinate amount of time to recover from a catastrophic event. With emerging computer devices, where power failures and network disconnections are common, such boot sequencing techniques take too much time and, are therefore, undesirable.

Another disadvantage of current file systems is that they tend to be media specific. That is, to adapt a file system to function with a particular brand or type of media it is often necessary to design (or redesign) one or more drivers to enable the file system to interface with the storage medium. As a result, some original equipment manufacturers (OEMs) of computer devices deploy vender supplied drivers associated with the vendor supplied storage medium. This results in having to develop intermediary drivers that are type specific to interface between the file system and the vendor supplied driver(s). If an OEM desires to change from one vendor's supplied storage media to a different vendor's supplied storage media, then the OEM typically has to develop new intermediary type specific drivers to interface with the new vendor supplied driver(s). This process is labor intensive, subject to errors and delays, and is expensive. As a result, many OEMs avoid having to change the particular brand or type of storage medium and become tied-in to a particular type/brand of storage medium.

Another drawback associated with current file systems is that they often use storage techniques inherently detrimental to operating characteristics of the storage medium. For example, repetitively storing to a specific area of the medium may damage and prematurely destroy the longevity of certain media. Many traditional file systems tend to use tables and other techniques that are located in fixed locations of the storage medium, which can be extremely harmful to certain types of data sources such as flash memory.

The aforementioned examples are only a few of the many limitations associated with current file systems. Accordingly, current file system techniques are unable to address an ever increasing demand for more robust and adaptable file systems.

SUMMARY

A transactional file system developed to function with flash memory is described in several exemplary implementations.

In one described implementation, a power failure event can be detected by a file system, components of the file system, or individual modules in the form or computer-executable instructions and/or logic. Meta-information is stored at a location on a flash medium indicated by a write pointer if a computer device shuts-down according to a normal shutdown mode. During initialization of the computer, a check is performed whether the meta-information is present in the location on the flash medium indicated by the write pointer. If the meta-information is present, then a conclusion is made that the computer shutdown according to the normal shutdown mode. However, if the meta-information is not present, a conclusion is made that the computer did not shutdown according to the normal shutdown mode; hence a power failure event is detected.

In another described implementation, a file system ensures data integrity if a power failure event occurs around the time data is being written to the flash medium. A write pointer is used to advance through a circular sequence of memory locations on the flash medium and indicate a memory location that is free to receive data as the write pointer advances. A power failure manager is configured to store metadata in the memory location indicated by the write pointer after completion of a write operation. When rebooting (e.g., initializing a computer or system), the file system scans the memory location indicated by the write pointer for the metadata. If the metadata is not found the file system concludes that a power failure event occurred prior to rebooting. Accordingly, the physical sector can be marked dirty to prevent only partial written data to be stored in a physical sector.

These and other implementations will be described below when read in conjunction with the accompanying drawings.

BRIEF DESCRIPTION OF THE DRAWINGS

The detailed description is described with reference to the accompanying figures. In the figures, the left-most digit(s) of a reference number identifies the figure in which the reference number first appears.

FIG. 9 illustrates a method for a storing metadata in-line with data.

FIG. 10A shows an exemplary implementation of a data structure generated by the file system.

FIG. 10B shows a data structure which is the same as the data structure shown in FIG. 10A, except its contents have been updated.

DETAILED DESCRIPTION

Introduction

To overcome the inefficiencies and problems described in the Background section above, the following description introduces the broad concept of a new open-architecture transactional file system that supports almost any type of data source. A "data source" as used herein means any type of object (either physical or virtual) that possesses the ability to read and write data. Examples of data sources include, but are not limited to: flash memory, hard disks, removable media, networks, Ethernet, and other related sources of data. As indicated, the data source does not have to be a storage media, but can include communication data sources as well. The file system uses interchangeable and/or customizable logic layers that can be substituted, removed, or modified to augment the behavior of the file system itself. Using interchangeable and/or customizable logic layers permits the file system to support many different operating characteristics exhibited by the many different types of data sources.

The following description also introduces the broad concept of storing data in a particular memory location and also storing metadata in the same memory location with the data, where the metadata is used as pointer to link the data with additional data in another memory location. This avoids the pitfalls of storing an allocation table in a fixed region of flash memory medium among other problems.

The following description also introduces the broad concepts of using meta-information in locations of a flash memory medium for detecting power failure events, storing transaction logs, providing transaction playback after a power failure event, ensuring data integrity after a power failure, and storing data (such as tables) spanning several physical locations.

The following description also introduces the broad concept of using a dynamic amount of memory to store logical-to-physical sector address mappings. Thus, the amount of memory needed to track data stored in the flash memory medium can be minimized. Additionally, through the use of counters associated with the dynamic amount of memory, it is possible to very quickly determine (without having to search through an entire data structure) whether to allocate more memory for storing logical-to-physical sector address mappings.

File System Architecture

Figure 1:
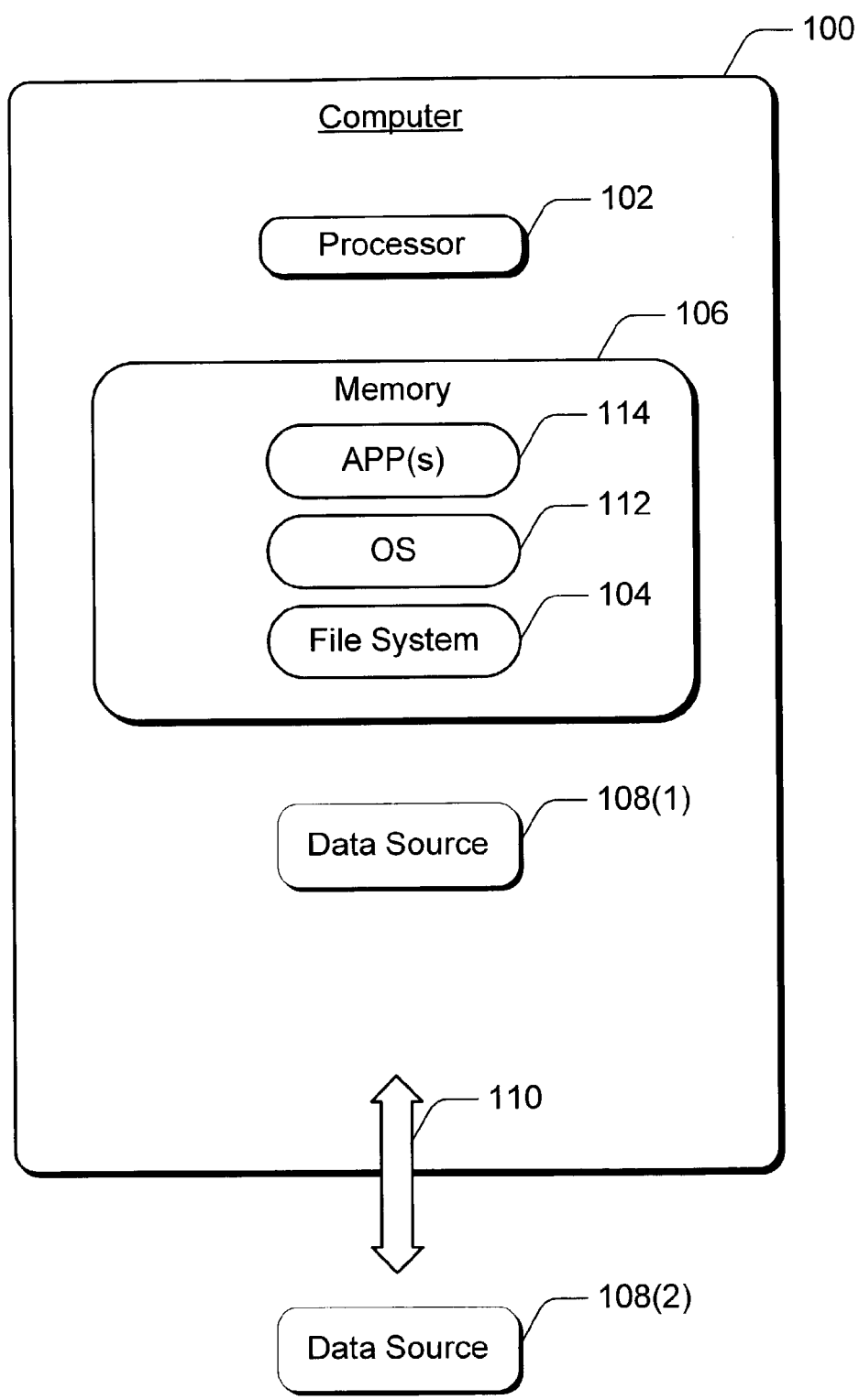
FIG. 1 shows a computer in which an open-architecture transactional file system may be implemented.

FIG. 1 shows a computer 100 in which an open-architecture transactional file system 104 (referred to generally as "file system 104") may be implemented. The computer 100 represents various different general purpose or special purpose computing system configurations, including but not limited to personal computers, server computers, hand-held or laptop devices, portable communication devices, tablet PCs, televisions/set-top boxes, wireless devices, printers, photocopiers, multiprocessor systems, microprocessor systems, microprocessor-based systems, programmable consumer electronics, gaming systems, multimedia systems, the combination of any of the above example devices, and other smart devices.

Computer 100 includes at least one processor 102 and memory 106. Computer 100 may also include a local data source 108(1) and/or may also be connected to a remote data source 108(2) via a communication link 110, such as a network, wireless link, or some type of other communication link. Computer 100 may include more than one data source and/or be connected to more than one data source. A data source, referred to generally as reference number 108, is an object (either physical or virtual) that possesses the ability to read and write data. Examples of data sources include, but are not limited to: flash memory, hard disks, removable media, networks, Ethernet, and other related sources of data.

Other elements such as power supplies, keyboards, touch pads, I/O interfaces, displays, LEDs, audio generators, vibrating devices, and so forth are not shown in FIG. 1, but could easily be a part of the exemplary computer 100. Additionally, although not shown, a system bus or point-to-point connections, typically connects the various components within computer 100.

Memory 106 may include volatile memory (e.g., RAM) and/or non-volatile memory (e.g., ROM, PCMCIA cards, etc.). In some implementations, memory 106 is used as part of computer's cache, permitting application data to be accessed quickly without having to permanently store data in a non-volatile memory device.

An operating system 112 is resident in the memory 106 and executes on processor 102. An example operating system implementation includes the Windows®CE operating system from Microsoft® Corporation, but other operation systems can be selected from one of many operating systems, such as DOS, UNIX, etc. For purposes of illustration, programs and other executable program components such as the operating system are illustrated herein as discrete blocks, although it is recognized that such programs and components reside at various times in different storage components of the computer including data source(s) 108, and are executed by processor of the computer 100.

One or more application programs 114 are loaded into memory 106 and run on operating system 112 or on other devices in communication with computer 100. Examples of application programs include, but are not limited to, email programs, word processing programs, spreadsheets programs, Internet browser programs, Web services and so forth.

Although shown in memory 106, file system 104 can reside in one or more applications, as part of the operating system or independently as separate code on a computer-readable medium that executes in conjunction with a virtual object, hardware, and/or firmware device. In the exemplary implementation, file system 104 resides as a component in the form of computer-executable instructions and/or logic within operating system 112, that when executed serves as a logical interface module between other application programs 114 and data source 108.

File system 104 is generally responsible for performing transactions on behalf of operating system 112 or one or more application programs 114. When data source 108 is in the form of a storage device, such as a hard drive or flash memory device, file system 104 is responsible for storing, retrieving, organizing files, and performing other related tasks.

File system 104 may also be responsible for communicating with a data source 108 that is not a traditional storage medium per se, such as a network or other computer via a network, in accordance with a protocol established by either the file system 104 or the data source 108. In any event, file system 104 is capable of accessing, sending, and/or storing information at a logical level in accordance with the conventions of the operating system and/or one or more application programs 114, but may also be configured to meet specific low level communication demands of the data source 108, with or without the use of a driver.

Accordingly, file system 104 is implemented to function as a direct interface between the computer 100 (via operating system 112 and/or application program 114) and any type of data source 108. Because file system 104 supports any type of data source 108 through its unique architecture to be described, file system 104 is considered media agnostic and can easily be ported for use with many different types of data sources 108. As shall be described in more detail, file system 104 enables power-failure safe data operations and can be configured to perform tasks particular to the type and/or brand of data source. For example, file system 104 (i) maintains data integrity, performs wear-leveling (if the data source is some type of the flash medium), (ii) minimizes data loss during a power interruption to computer 100 or loss of connection with a data source 108, and (iii) permits OEMs of computers 100 to support their respective data sources regardless of the manufacturer. Ultimately, file system 104 has the ability to read, write, erase, and manage files in conjunction with any type of data source.

Figure 2:
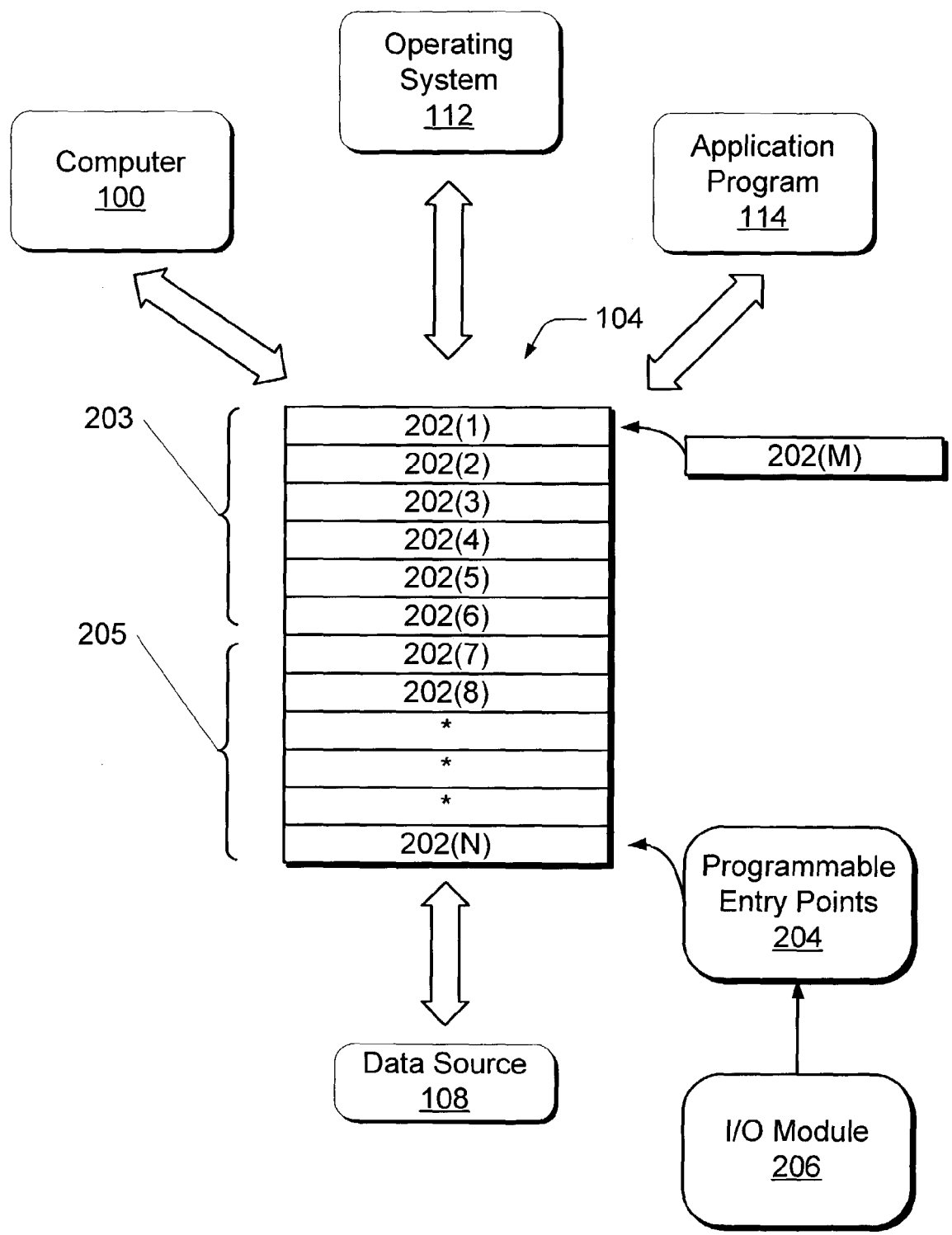
FIG. 2 shows a more detailed representation of the file system shown in FIG. 1.

FIG. 2 shows a more detailed representation of file system 104 shown in FIG. 1. File system 104 includes logic layers 202(1), . . . , 202(N). Each of the logic layers, referred to generally as reference number 202, represent layers of abstraction containing various operating parameters per layer. For instance, the topmost layer 202(1), being closest to the operating system 112, application programs 114, or computer 100, serves as an entry point to file system 200. Whereas, the bottom most layer 202(N), being closest to data source 108, represents the layer that directly accesses the data source 108.

When a data request is received at the entry point layer 202(1) to file system 200, each of the logical layers may be responsible for performing different duties (i.e., functions, tasks, etc.) in response to the data request. As used herein, a "data request" generally means reading data from the data source and/or writing data to the data source. Typically, the upper level logic layers 203 perform higher level managerial operations and the lower level logic layers 205 are assigned more detailed specific operations relating to communicating with the data source 108. In some instances, the upper logic layers 203 may operate in conjunction with lower level logic layers 205 by passing tasks associated with servicing a data request down the chain of layers (e.g., from 202(1) down to 202(2) down to 202(3), and so forth) to the lower level logic layers 205. In other instances the upper logic layers 203 may operate independently and service the data request directly without passing the request down to the lower level layers 205 to handle. Still in other instances, the upper logic layers 203 may generate their own requests in response to the initial data request, and pass them down to lower level logic layers 205 to handle. Thus, the logic layers 202 as a whole manage operations on behalf of an application 116, or operating system 112, when either the operating system or application(s) makes a data request to data source 108.

Each of logic layers 202 is also interchangeable. As used herein, "interchangeable" means that each logic layer can be removed altogether or another logic layer having different operating characteristics can be substituted in its place. Accordingly, functionality (i.e., operational behavior) of the file system 104 is augmentable by substituting or removing one or more of the logic layers 202.

For instance, by having well defined interfaces between each logic layer, it is possible to have different types of the same level logical layer that can be selected from a set of possible layers to plug into the file system 104 and change the operational behavior of file system 104. For example, it may be desirable to substitute logic layer 202(1) with a logic layer 202(M), when the data source is changed from one type of medium to another. Accordingly, logic layer 202(1) can be removed from file system 104 and logic layer 202(M) can be plugged-in, in place of logic layer 202(1). Thus, having interchangeable logic layers permits the file system to support many different operating characteristics exhibited by the many different types of data sources that may be supported by file system 104.

Generally, each logic layer 202 can be replaced as long as it satisfies the interface(s) for the layer above it (if there is a layer above it) and below it (if there is a layer below it). For example, logic layer 202(N) for interfacing with one type of data source can be replaced with a different logic layer that supports a different data source. Moreover, a set of layers, such as 202(2) through 202(5) for example, can also be replaced, combined, or removed so long as the upper most layer in the set (e.g., 202(2)), satisfies the interface for the layer above it in the file system 200.

Each of logic layers 202 is also customizable. As used herein, "customizable" means that each logic layer can be programmed (e.g., configured) to behave in accordance with different operating characteristics. In other words, one or more of the logic layers 202 are programmably configurable by a user (such as a manufacturer of computer 100 or developer of a data source 108). A set of programmable entry points 204, permits the user to program one of more of the logic layers to initialize or augment the operational behavior of file system 104. In one implementation, an I/O module 206 contains specific code for the user to select in order to customize one or more of the logic layers 202. For example, if the user desires to customize the file system 104 to function in accordance with a particular algorithm selected by the user to communicate with a particular data source, the user through the set of programmable entry points 204 via the I/O module 206, may configure the lowest layer logic layer 202(N) (or other layers) to directly interface with the data source according to the particular algorithm. Thus, having customizable logic layers permits the file system to support many different operating characteristics exhibited by the many different types of data sources that may be supported by file system 104.

Figure 3:
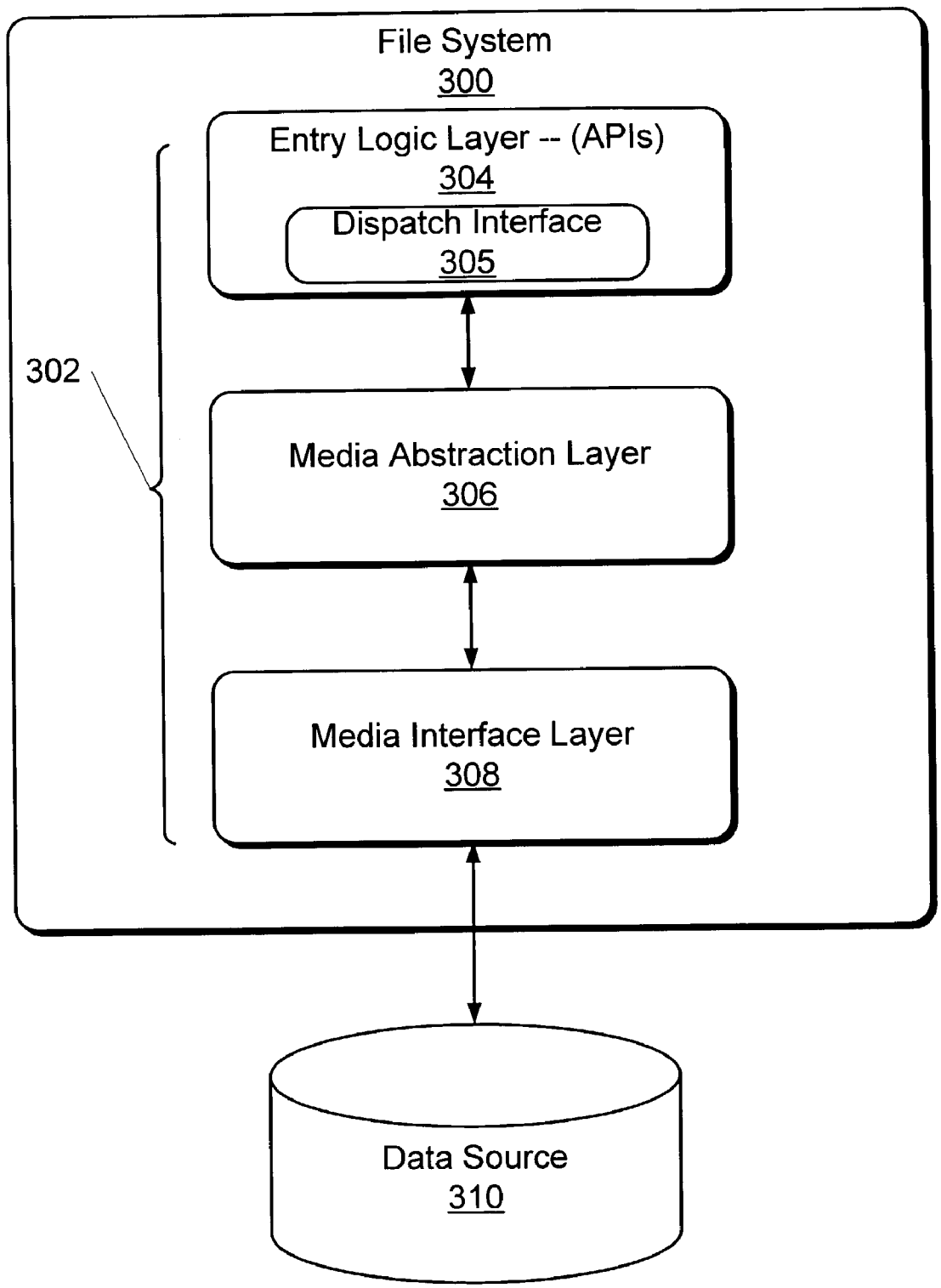
FIG. 3 shows an open-architecture transaction file system that includes three interchangeable and/or customizable logic layers.

FIG. 3 shows an open-architecture transaction file system 300 (hereinafter referred to as "file system 300") that includes three interchangeable and/or customizable logic layers. In particular, file system 300 includes an entry logic layer 304, a media abstraction layer 306, and a media interface layer 308. Although the exemplary implementation is shown to include these three elements, various features from each them may be selected to carry out some of the more specific implementations described below. So while the described implementation shows three distinct layers of logic, many of the techniques described below can be implemented without necessarily requiring all or a portion of the features from either layer of logic. Furthermore, the techniques may be implemented without having the exact division of responsibilities as described below.

Entry logic layer 304 serves as the entry point to file system 300 from program application(s), the operating system, and/or computer. Like logic layer 202(1) shown in FIG. 1, entry logic layer 304 is the upper most layer of file system 300. In the exemplary implementation, entry logic layer 304 includes a set of Application Protocol Interfaces (APIs) that are accessible by program application(s), the operating system, and/or computer. In other words, the APIs are contained as code within entry logic layer 304 and are exposed by file system 300 for program applications, the operating system, and the computer to use. Examples of the types of operations that may be supported by layer 304 include: (i) creating a file, (ii) deleting a file, (iii) writing to a file, and (iv) other file operations typically performed by a program application, etc. Thus, entry logic layer 304 is responsible for implementing the code necessary to perform requested operations on behalf of a calling application wherein the calling application includes not only program applications, but the operating system as well as the computer.

Connecting the entry logic layer 304 to other layers of file system 300 is a dispatch interface 305, which is a component of the entry logic layer 304, but can also be implemented as a separate logic layer or within other layers. The purpose of the dispatch interface 305 is to forward all media specific API data requests to the media abstraction layer 306. The media abstraction layer 306 is then responsible for ensuring that all data requests are carried out by it or by one or more other layers. Dispatch interface 305 in one exemplary implementation includes code in the form of APIs. Dispatch interface 305 handles transactions as well as standard data requests in the form of reading and writing data to the data source 310. Dispatch interface 305 also includes code to maintain a file system directory structure and service storage and retrieval requests for files, etc.

Media abstraction layer 306 is configured to manage input and output data requests received from entry logic layer 304 via dispatch interface 305. Media abstraction layer 306 serves as a translation layer to file system 300 and is responsible for many different functions. In one implementation, media abstraction layer 306 is responsible for (i) handling all input/output (I/O) requests from entry logic layer 304, (ii) performing catastrophic event detection (such as detecting a power failure or a network disconnection) and correction, (iii) maintaining data integrity in the event of a catastrophic event, (iv) performing logical to physical transformations, and (v) maintaining a transaction log which is typically a media specific implementation associated with storage devices. Many of these functions are described in more detail below or in Aasheim '672.

The media abstraction layer 306 isolates the entry logic layer 304 from the device specifics of the underlying data source 310. Consequently, file system 300 can easily be ported to entirely new types of device by implementing a media abstraction layer 306 specific to the brand and/or type of data source 310. Again, the data source 310 could be any type of data source, such as a hard disk, removable storage, network attached storage, wireless network, etc. This permits the entry logic layer 304 to generically support calling applications without having to be configured or reconfigured to interface with lower level logic layers.

Media interface layer 308 is configured to interface directly with the data source 310 and further isolates upper logic layers from the electrical specifics of the data source. Accordingly, media interface layer 308 is configured to carry out the lowest of lower level communications on behalf of file system 300 in response to data requests. It is intended that the media interface layer 308 be programmably configurable by a user (i.e., OEM) to directly interface with the data source. Practically, this means that different brands/types of the same type of media can be supported without having to make changes to the media abstraction layer 306. Thus, assuming that the data source is of the same type but of a different brand, then an OEM may only need to create a new or modified media interface layer 308.

Thus, file system 300 is media agnostic allowing OEMs to use the file system across a wide variety of different types of data sources 310. Generally, the entry logic layer 304 does not need to be configured to have intimate knowledge of the operating characteristics of the data source. Each of the interchangeable and customizable layers 304, 306, and 308, also permits OEMs to easily customize the different layers for their respective data sources.

File System Implementations for Flash

As mentioned above, the data source may include a variety of different types and/or brands of data sources. Although many of the embodiments described below are described in conjunction with flash memory as the data source, such is not required for the operation of the claimed inventions. Other various examples of data sources mentioned above will suffice to implement many of the inventions describe herein, such as the overall architecture of file system 104, and 300 described above with reference to FIGS. 1, 2 and 3.

Flash Medium Operating Characteristics

This discussion assumes that the reader is familiar with basic operating principles of flash memory media. Nevertheless, a general introduction to two common types of nonvolatile random access memory, NAND and NOR Flash memory media, is provided to better understand the exemplary implementations described herein. These two example flash memory media were selected for their current popularity, but their description is not intended to limit the described implementations to these types of flash media. Other electrically erasable and programmable read-only memories (EEPROMs) would work too. In most examples used throughout this Detailed Description numbers shown in data structures are in decimal format for illustrative purposes.

Figure 4:
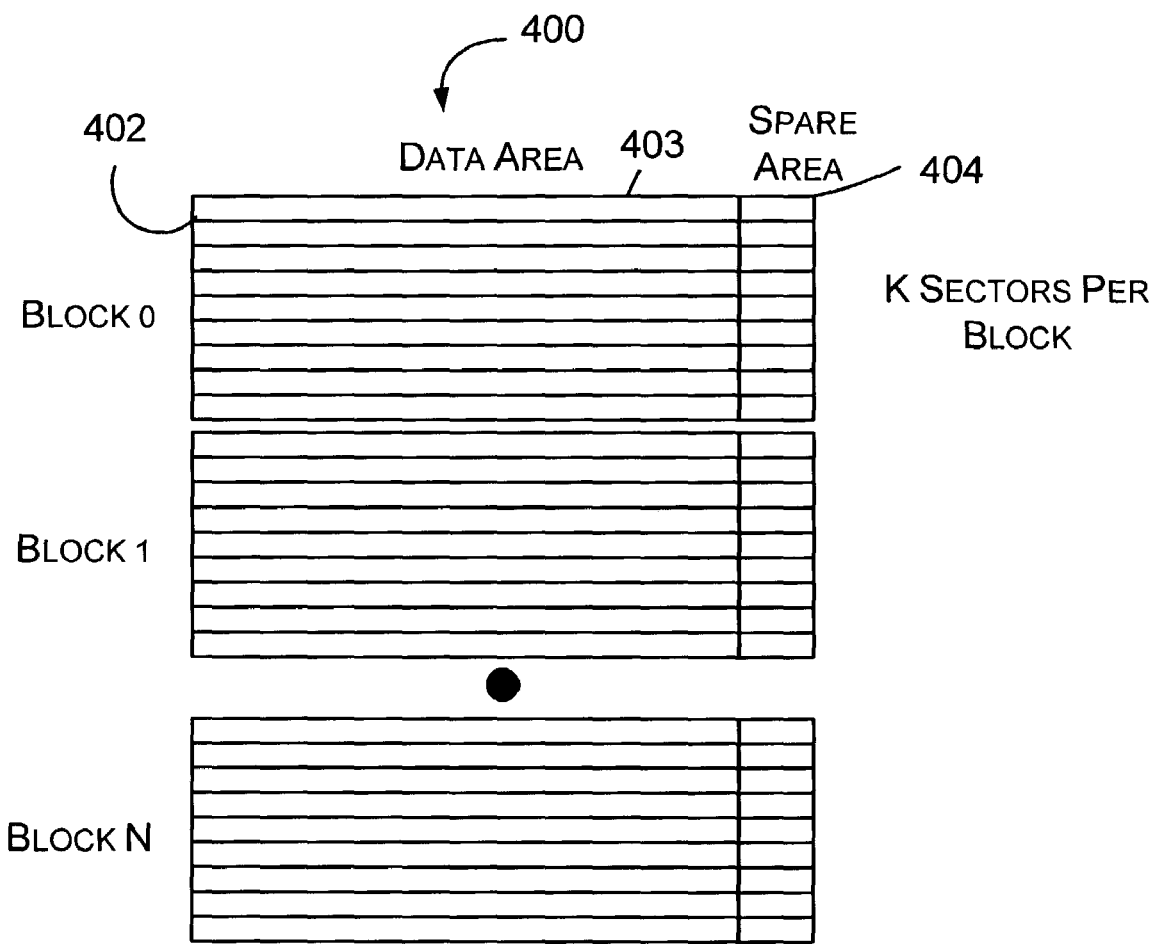
FIGS. 4 and 5 illustrate logical representations of example NAND and NOR flash memory, respectively.
Figure 5:
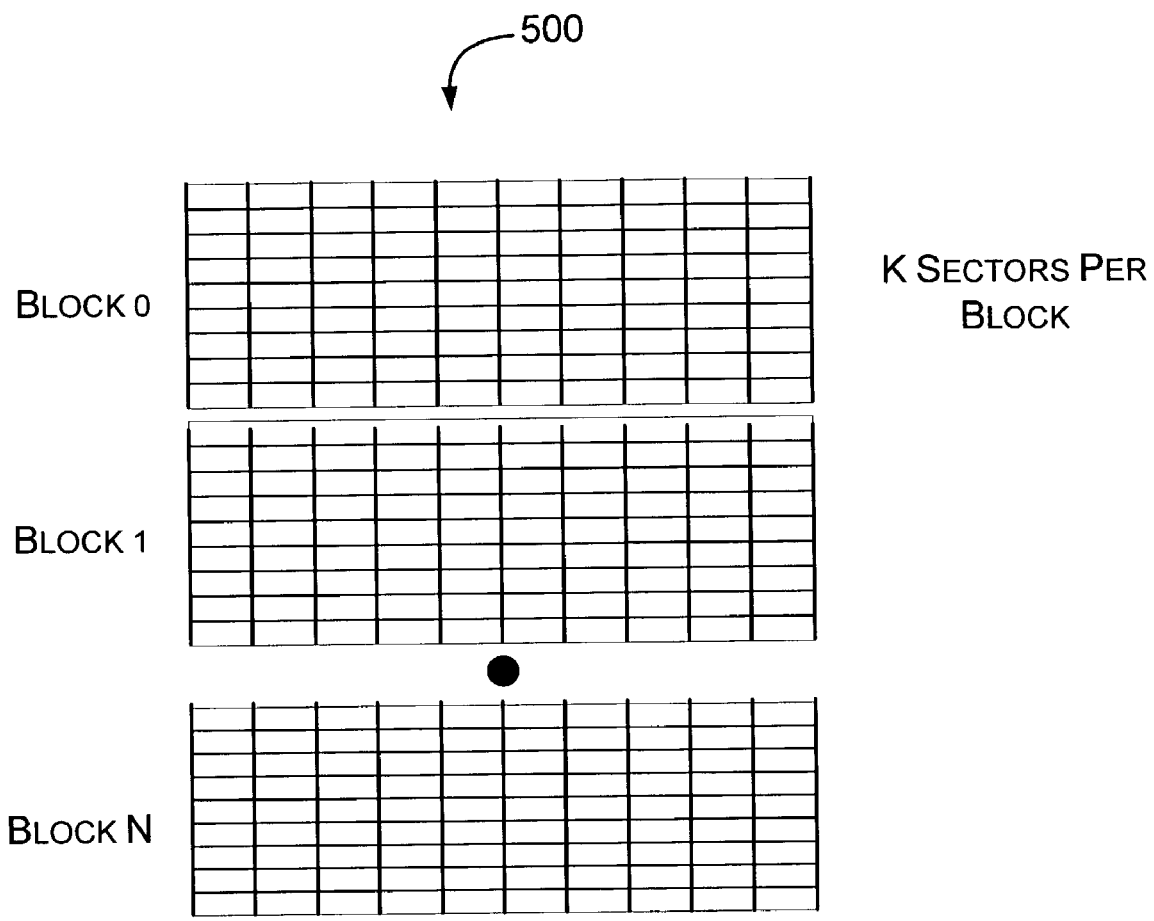

FIGS. 4 and 5 illustrate logical representations of example NAND and NOR flash memory media 400, 500, respectively. Both media have universal operating characteristics that are common to each, respectively, regardless of the manufacturer. For example referring to FIG. 4, a NAND flash memory medium is generally split into contiguous blocks (0, 1, through N). Each block 0, 1, 2, etc. is further subdivided into K sectors 402; standard commercial NAND flash media commonly contain 8, 16, or 32 sectors per block. The amount of blocks and sectors can vary, however, depending on the manufacturer. Some manufacturers refer to "sectors" as "pages." Both terms as used herein are equivalent and interchangeable.

Each sector 402 is further divided into two distinct sections, a data area 403 used to store information and a spare area 404 which is used to store extra information such as error correction code (ECC). The data area 403 size is commonly implemented as 512 bytes, but again could be more or less depending on the manufacturer. Commonly, the size of the area spare 404 is implemented as 16 bytes of extra storage for NAND flash media devices. Again, other sizes, greater or smaller can be selected. In most instances, the spare area 404 is used for error correcting codes, and status information.

A NOR memory medium 500 is different than NAND memory medium in that blocks are not subdivided into physical sectors. Similar to types of RAM devices, each byte stored within a block of NOR memory medium is individually addressable. Practically, however, blocks on NOR memory medium can logically be subdivided into physical sectors with the accompanying spare area.

Aside from the overall layout and operational comparisons, some universal electrical characteristics (also referred to herein as "memory requirements" or "rules") of flash devices can be summarized as follows:

1. Write operations to a sector can change an individual bit from a logical '1' to a logical '0', but not from a logical '0' to logical '1' (except for case No. 2 below);
2. Erasing a block sets all of the bits in the block to a logical '1';
3. It is not generally possible to erase individual sectors/bytes/bits in a block without erasing all sectors/bytes within the same block;
4. Blocks have a limited erase lifetime of between approximately 100,000 to 1,000,000 cycles;
5. NAND flash memory devices use ECC to safeguard against data corruption due to leakage currents; and
6. Read operations do not count against the write/erase lifetime.

Resident Flash File System

Figure 6:
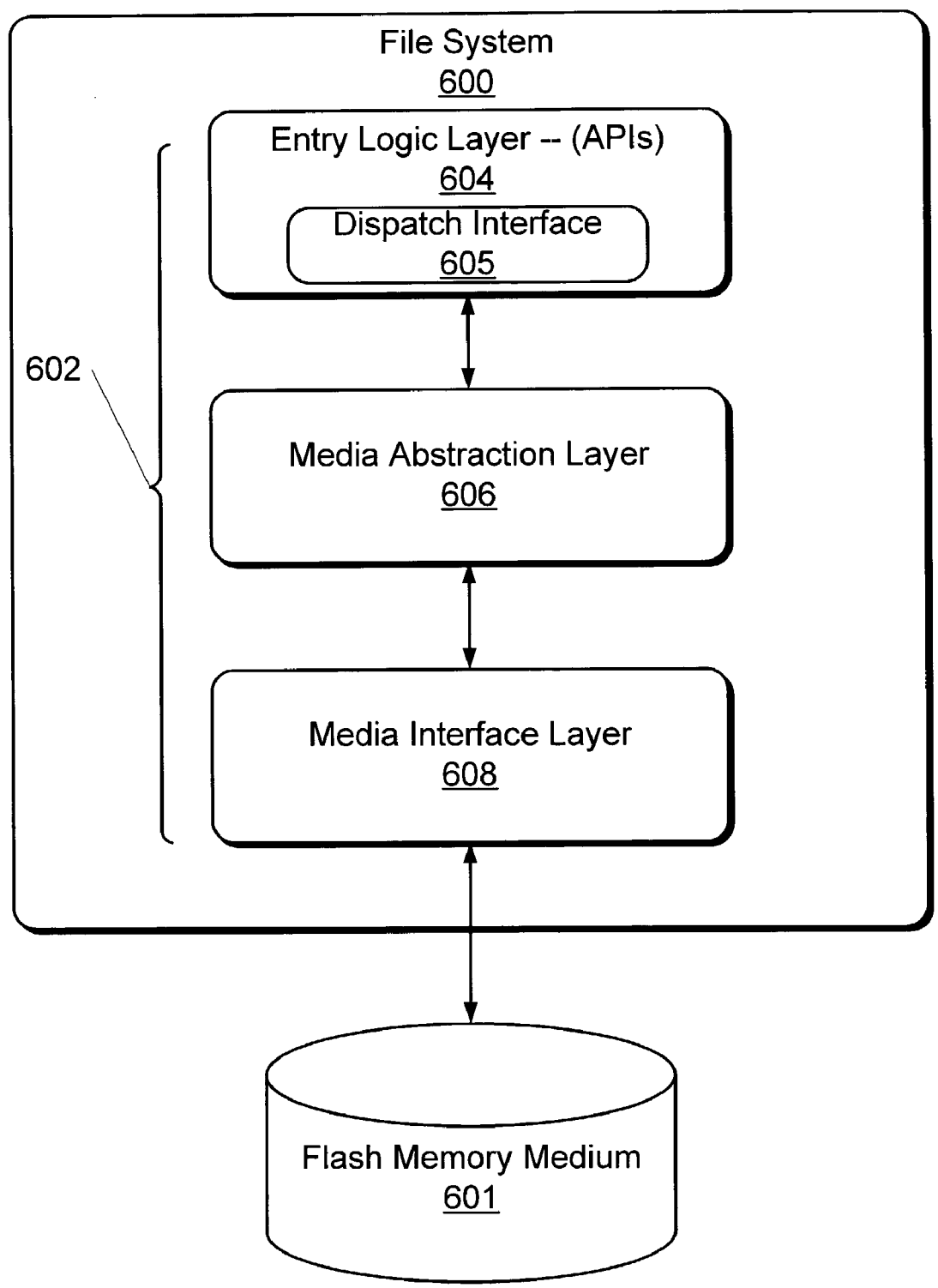
FIG. 6 shows a transactional file system implemented for a flash memory media such as those described in FIGS. 4 and 5.

FIG. 6 shows a transactional file system 600 ("file system 600") implemented for a flash memory media, such as those described in FIGS. 4 and 5. Like file system 300, file system 600 includes three interchangeable and/or customizable logic layers 602 that operate as part of a computer such as computer 100 shown in FIG. 1. In particular, file system 600 includes an entry logic layer 604, a media abstraction layer 606, and a media interface layer 608. Although the exemplary implementation is shown to include these three elements, various features from each them may be selected to carry out some of the more specific implementations described below. So while the described implementation shows three distinct layers of logic, many of the techniques described below can be implemented without necessarily requiring all or a portion of the features from either layer of logic. Furthermore, the techniques may be implemented without having the exact division of responsibilities as described below For a general understanding of the responsibilities of layers 604, 606, and 608 please refer to file system 300 described above. Otherwise, the following discussions will primarily focus on features provided by media abstraction layer 606. Media abstraction layer 606 is responsible for generally performing logical-to-physical transformations, ensuring data integrity, transaction logging, wear-leveling, power-failure detection and correction, and other related tasks. To accomplish these tasks, the media abstraction layer is composed of several modules each responsible for performing their own task in conjunction with the other modules.

Figure 7:
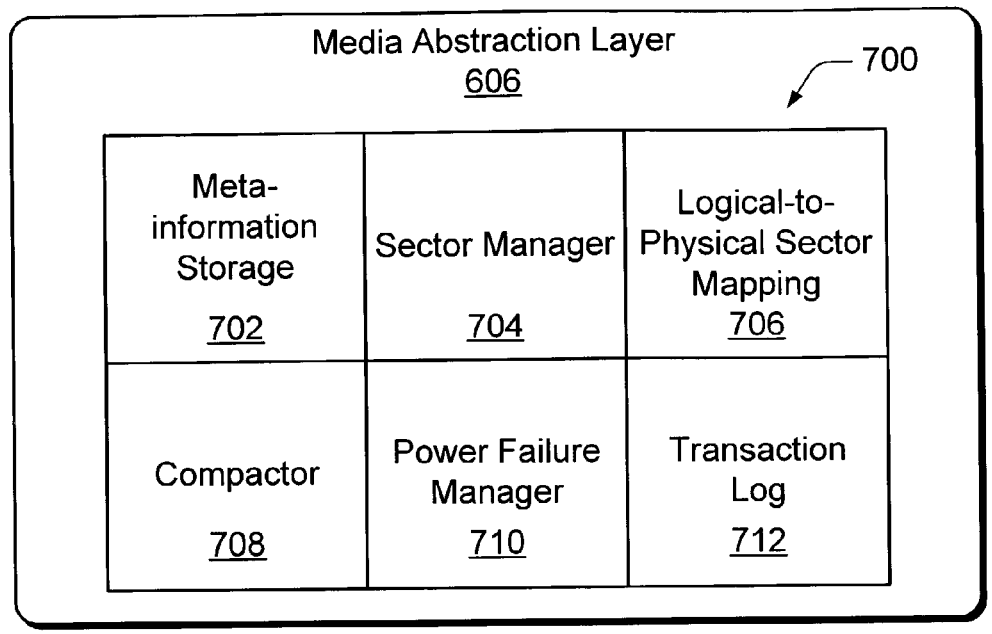
FIG. 7 shows modules configured for the media abstraction layer of the transactional file system.

FIG. 7 shows modules 700 implemented for media abstraction layer 606. Modules 700 are comprised of a meta-information storage module 702, sector manager 704, a logical-to-physical sector mapping module 706, a compactor module 708, a power failure manager module 710, and a transaction log module 712. Functionality provided by each of the modules is not restricted to a file system and can be implemented separately or in conjunction with a program application(s), an operating system(s), or drivers.

Briefly, the meta-information storage module 702 stores files using meta-information to link the files if data associated with the files spans over several sectors. The sector manager 704 provides a pointer to a sector available, i.e., "free" to receive new data. The logical-to-physical sector mapping module 706 manages data as it goes from a file system domain of logical sector addressing to a flash medium domain of physical sector addressing. The compactor module 708 provides a mechanism for clearing blocks of data (also commonly referred to in the industry as "erasing")

to ensure that enough free sectors are available for writing data. Compactor module 708 permits file system 600 to perform uniform and even wear-leveling. Power failure manager module 710 detects when a power failure event has occurred and takes correction action to ensure that data integrity is maintained by the file system. Transaction log module 712 is responsible for recording transaction information on the flash medium and permits the media abstraction layer 606 to play back transactions in the event there is a power failure prior to completing the transactions. Aspects of each of these modules 700 shall be described in more detail below.

Meta-information Storage

File system 600 (FIG. 6) does not use an allocation table to store the file system's meta-information. Although file system 600 could be implemented to do so, there are drawbacks to doing so: (1) Updating an allocation table unnecessarily wears down the life of a flash medium and creates too many dirty sectors; and (2) each physical sector of flash memory has a limited number of non-overlapping writes, consequently, there is no efficient guarantee that data integrity of individual sectors in the allocation table during a power-failure event. Media abstraction layer 606, through the meta-information storage module 702, overcomes these problems by storing data on the flash medium as a series of linked-lists.

Figure 8:
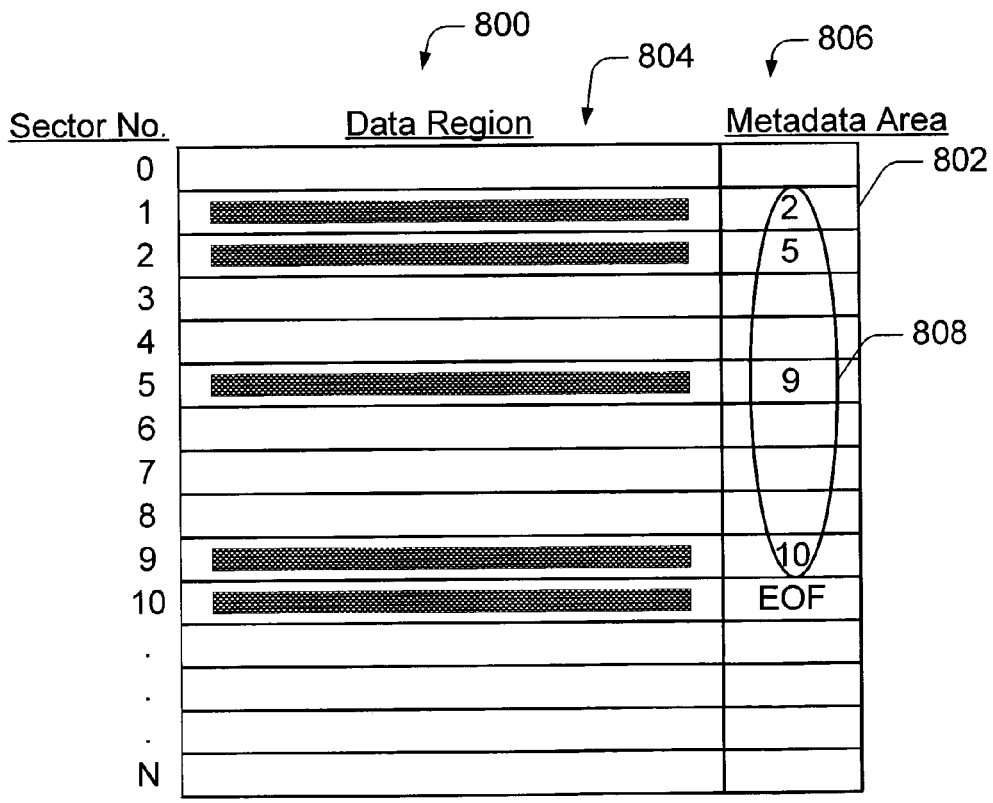
FIG. 8 shows how a meta-information storage module stores data on the flash medium.

FIG. 8 shows how meta-information storage module 702 stores data on the flash medium 800. Referring to FIG. 8, flash medium 800 represents any type of flash medium. Physical sectors 802 are logically organized into two regions: a data region 804 for storing data, such as files, directories, attributes, etc., and a metadata area 806 of the flash medium that can be used to store meta-information. In particular, data (represented as a shaded pattern) is stored in data region 804 and pointers 808, represented in this example as 2, 5, 9, and 10 are stored in metadata area 806. Each pointer 808 contains meta-information that indicates the next physical sector containing valid data. For example, suppose a file uses five sectors to store data spanning physical sectors 1, 2, 5, 9, and 10. Notice that within each physical sector, there is a pointer indicating the next physical sector containing data. The chain of sectors ends with an "end of file" (EOF) indicator. In other words, the meta-information (e.g., 2, 5, 9, and 10) links the individual sectors together in a list referred to herein as a "linked list," which in the example of FIG. 8 is the combination of all pointers 808.

Using this directory structure, meta-information such as pointers 808, are stored inline with the data being written to the flash medium 800. This permits file system 600 to limit the number of non-overlapping write operations per sector. Additionally, the spare area 806 found in most flash memory media can be used to store metadata bits to explicitly track write operations to either region, data 804 or spare area 806. Also by storing meta-data such as pointers 808 in line with data rather than in a table, it is possible to ensure the validity of data in a sector during a power-failure event.

In the exemplary implementation, data region 804 and metadata region 806 do not include the spare area of 404 of a NAND flash memory device, which is shown in FIG. 4. That is, the first region (data region 804) and the second region (metadata region 806) reside within the data area 403 of the device. Nevertheless, metadata region 806 is not limited to the data area 403 and can reside anywhere within a physical sector including the spare area, such as spare area 404 of FIG. 4.

FIG. 9 illustrates a method 900 for storing metadata in-line with data. Method 900 includes blocks 902 and 904. The order in which the method is described is not intended to be construed as a limitation. Furthermore, the method can be implemented by file system 600, but may also be implemented in any suitable hardware, software, firmware, or combination thereof.

At block 902, data is stored in a first region of a physical sector of a flash medium. For example, data may be stored in a data region 804 (FIG. 8) for storing data, such as files, directories, file attributes, and other file related items. At block 904, a pointer is stored in second region of the physical sector indicating a next physical sector in which valid data is located on the flash medium. For example, referring to FIG. 8, a pointer 2 is stored in the meta-information region (metadata area) 806 of physical sector 1. Pointer 2 indicates the next physical sector (physical sector 2) in which valid data is located on the flash medium. In other words, pointer 2 links the location of data stored in physical sector 1 to data stored in physical sector 2. Process 900 will normally repeat itself until all data locations are linked together.

Tracking Data

File system 600 uses logical sector addressing to read and store information on flash memory. Logical sector addresses are address locations that the file system reads and writes data to. They are "logical" because they are relative to the file system. In actuality, data may be stored in completely different physical locations on the flash memory. These physical locations are referred to as physical sector addresses.

File system 600 is responsible for linking all logical sector address requests (i.e., read & write) to physical sector address requests. The process of linking logical-to-physical sector addresses is also referred to herein as mapping. Going from logical to physical sector addresses permits file system 600 to have maximum flexibility when deciding where to store data on the flash memory medium 601. Logical-to-physical sector mapping module 706 permits data to be flexibly assigned to any physical location on the flash memory medium, which provides efficiency for other tasks, such as wear-leveling and recovering from a power failure. It also permits the file system 600 at entry level logic layer 604 to store data (send data requests to media abstraction layer 606), without needing intelligence to know that the data is actually being stored on a flash medium in a different fashion.

FIG. 10A shows an exemplary implementation of a data structure (i.e., a table) 1000A generated by the file system 600. The data structure 1000A is stored in a volatile portion of memory 106 (see FIG. 1), such as some type of random access memory (RAM). The data structure 1000A includes physical sector addresses 1002 that have a corresponding logical sector address 1004. An exemplary description of how table 1000A is generated is described with reference to FIG. 11.

Figure 11:
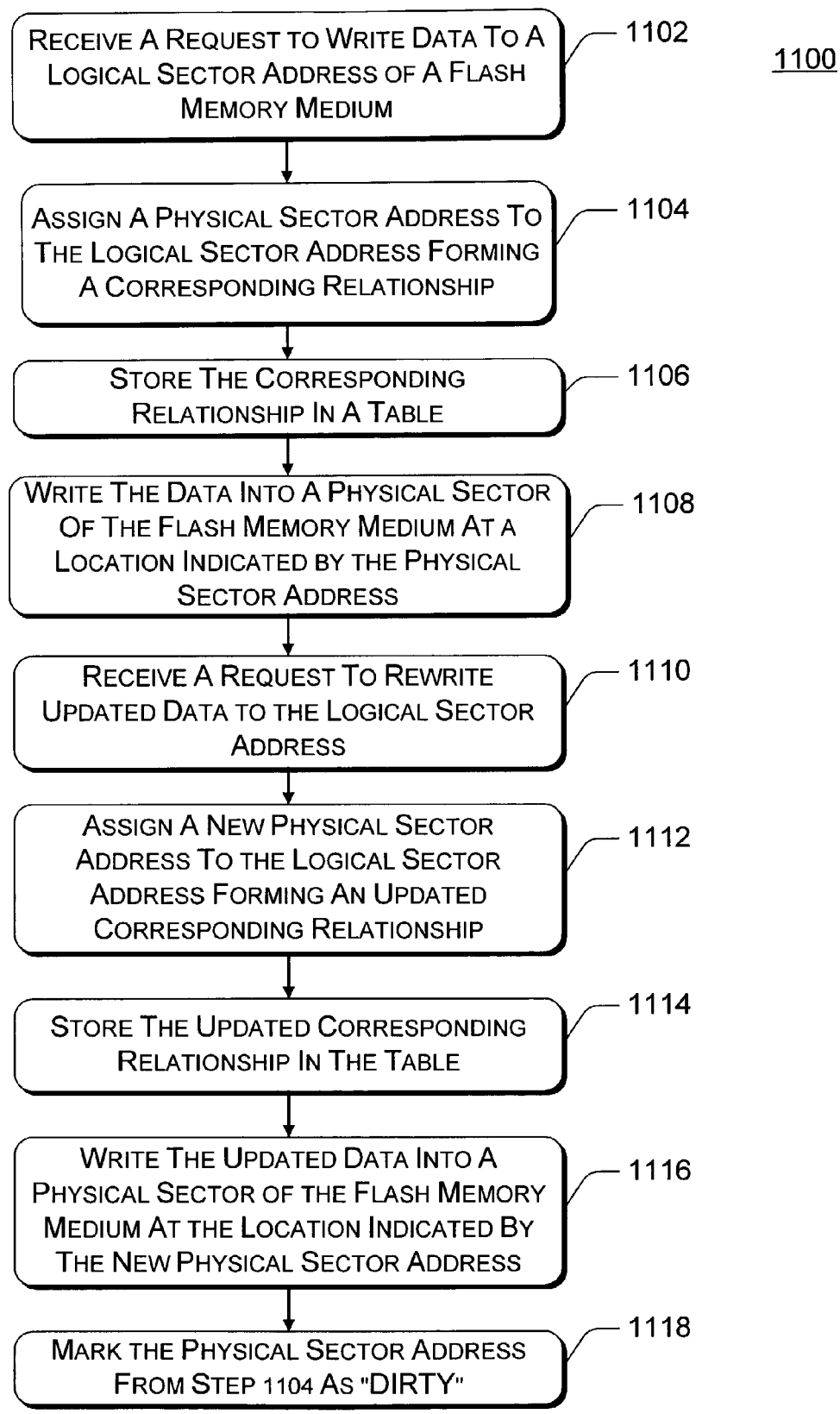
FIG. 11 illustrates a method used to track data on a flash memory medium when the file system performs write requests.

FIG. 11 illustrates a method 1100 used to track data on a flash memory medium 601 when the file system 600 performs write requests. Method 1100 includes blocks 1102-1118. The order in which the method is described is not intended to be construed as a limitation. Referring to FIGS. 10A and 11, at block 1102, media abstraction layer 606 receives a request to write data to a specified logical sector address 1004.

At block 1104, the sector manager 704 ascertains a free physical sector address location on the flash medium that can accept data associated with the write request (how the sector manager 704 chooses physical sector addresses will be explained in more detail below), A free physical sector is any sector that can accept data without the need to be erased first. Once the sector manager 704 receives the physical sector address associated with a free physical sector location, the logical-to-physical sector mapping module 706 assigns the physical sector address to the logical sector address 1004 specified by write request forming a corresponding relationship. For example, a physical sector address of 0 through N can be assigned to any arbitrary logical sector address 0 through N.

Next, at block 1106, the logical-to-physical sector mapping module 706 stores the corresponding relationship of the physical sector address to the logical sector address in a data structure, such as the exemplary table 1000A in memory 106. As shown in the exemplary data structure 1000A, three logical sector addresses 1004 are assigned to corresponding physical sector addresses 1002.

Next, at block 1108 data associated with the logical sector address write request is stored on the flash medium at the physical sector address location assigned in block 1104. For example, data would be stored in logical sector address location of zero on the medium 601, which corresponds to the physical sector address of 11.

Now, at block 1110, suppose for example purposes another write request is received by media abstraction layer 606, but in this case, to modify data associated with a logical sector address previously issued in block 1102. Then, file system 600 performs functionality described in blocks 1112 through 1114, which are identical to steps 1104 through 1108, respectively, and are described above.

In block 1118, however, after the updated data associated with performing block 1110 is successfully stored on the flash medium, the logical-to-physical sector mapping module 706 marks the old physical sector address assigned in block 1104 as "dirty." Old data is marked dirty after new data is written to the medium 601, so in the event there is a power failure in the middle of the write operation, the logical-to-physical sector mapping module 706 will not lose old data. It is possible to lose new or updated data in blocks 1102 or 1110, but since there is no need to perform an erase operation only one item of new or modified data is lost in the event of a power failure.

FIG. 10B shows a data structure 1000B which is the same as data structure 1000A, except its contents have been updated. In this example the file system 600 has updated data associated with logical sector address 11. Accordingly, file system 600 reassigns physical sector address 11 to logical sector address 3 and stores the reassigned corresponding relationship between the these two addresses in data structure 1000B. As illustrated in data structure 1000B, the contents of physical sector 11 are actually written to logical sector address 3 and the contents of sector 0 are marked "dirty" after the data contents are successfUlly written into logical sector address 3 as was described with reference to blocks 1110–1118.

This process of reassigning logical-to-physical sector address when previously stored data is updated by the file system 600, permits write operations to take place without having to wait to move an entire block of data and perform an erase operation. So, method 1100 permits the data structure to be quickly updated and then the physical write operation can occur on the actual physical medium. Media abstraction layer 606 uses the data structures, such as 1000A/1000B, to correctly maintain logical-to-physical mapping relationships.

When there is a read request issued by or to files system 600, the media abstraction layer 606 via logical-to-physical mapping module 706, searches the data structure (such as 1000A or 1000B) to obtain the physical sector address which has a corresponding relationship with the logical sector address associated with read request. Media abstraction layer 606 then uses that physical sector address as a basis to send data associated with the read request back to entry logic layer 604. Accordingly, entry logic layer 604 does not need intelligence to know that its requests to logical sector addresses are actually mapped to physical sector addresses.

Write Pointer and Continuous Circle

Figure 12:
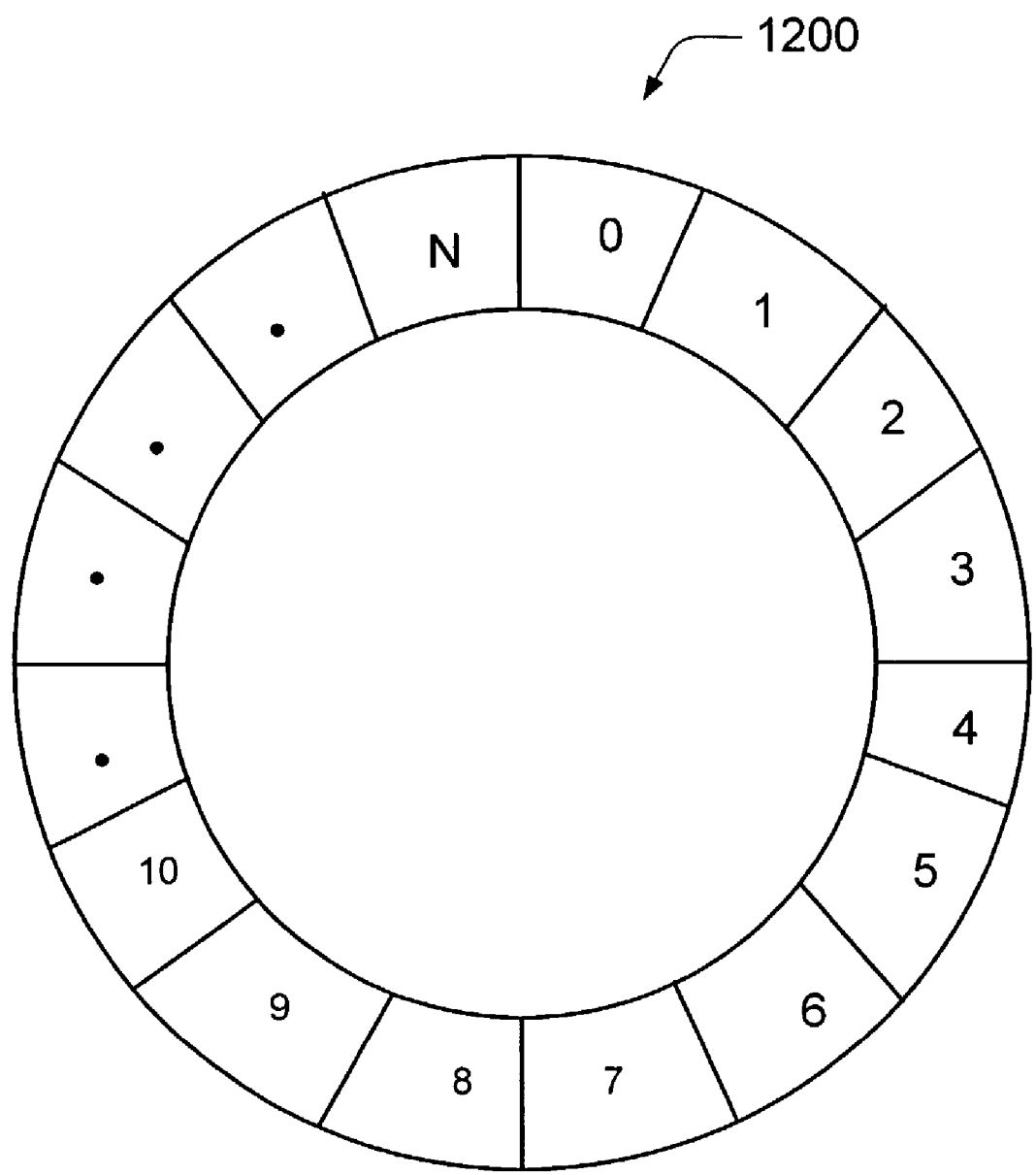
FIG. 12 shows a flash memory medium viewed and/or treated as a continuous circle by the file system.

FIG. 12 is a diagram of flash memory medium 601 viewed and/or treated as a continuous circle 1200 by the file system 600. Physically the flash memory media is the same as either media shown in FIGS. 4 and 5 for instance, except media abstraction layer 606 organizes the flash memory medium as if it is a continuous circle 1200, containing 0-to-N blocks. Accordingly, the highest physical sector address (individual sectors are not shown in FIG. 12 to simplify the illustration, but may be seen in FIGS. 4 and 5) within block N and the lowest physical sector address within block 0 are viewed as being contiguous.

Figure 13:
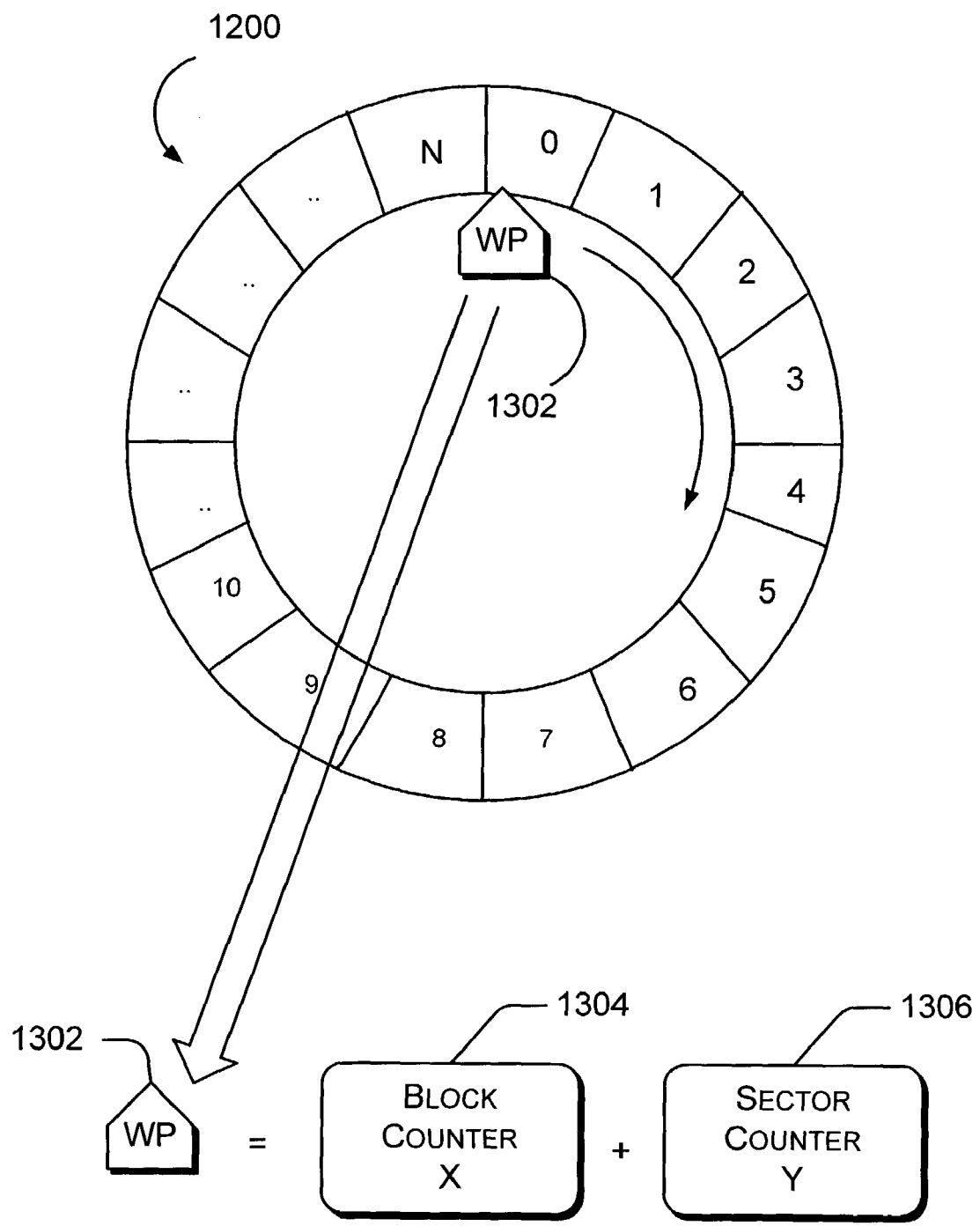
FIG. 13 illustrates another view of a flash memory medium viewed as a continuous circle.

FIG. 13 illustrates another view of media 601 viewed as a continuous circle 1200. In this exemplary illustration, the sector manager 704 maintains a write pointer 1302, which indicates a next available free sector to receive data on the medium. The next available free sector is a sector that can accept data without the need to be erased first in a prescribed order. The write pointer 1302 is implemented as a combination of two counters: a sector counter 1306 that counts sectors and a block counter 1304 that counts blocks. Both counters combined indicate the next available free sector to receive data.

In an alternative implementation, the write pointer 1302 can be implemented as a single counter and indicate the next physical sector that is free to accept data during a write operation. According to this implementation, the sector manager 704 maintains a list of all physical sector addresses free to receive data on the medium. The sector manager 704 stores the first and last physical sector addresses (the contiguous addresses) on the medium and subtracts the two addresses to determine an entire list of free sectors. The write pointer 1302 then advances through the list in a circular and continuous fashion. This reduces the amount of information needed to be stored by the sector manager 704.

Figure 14:
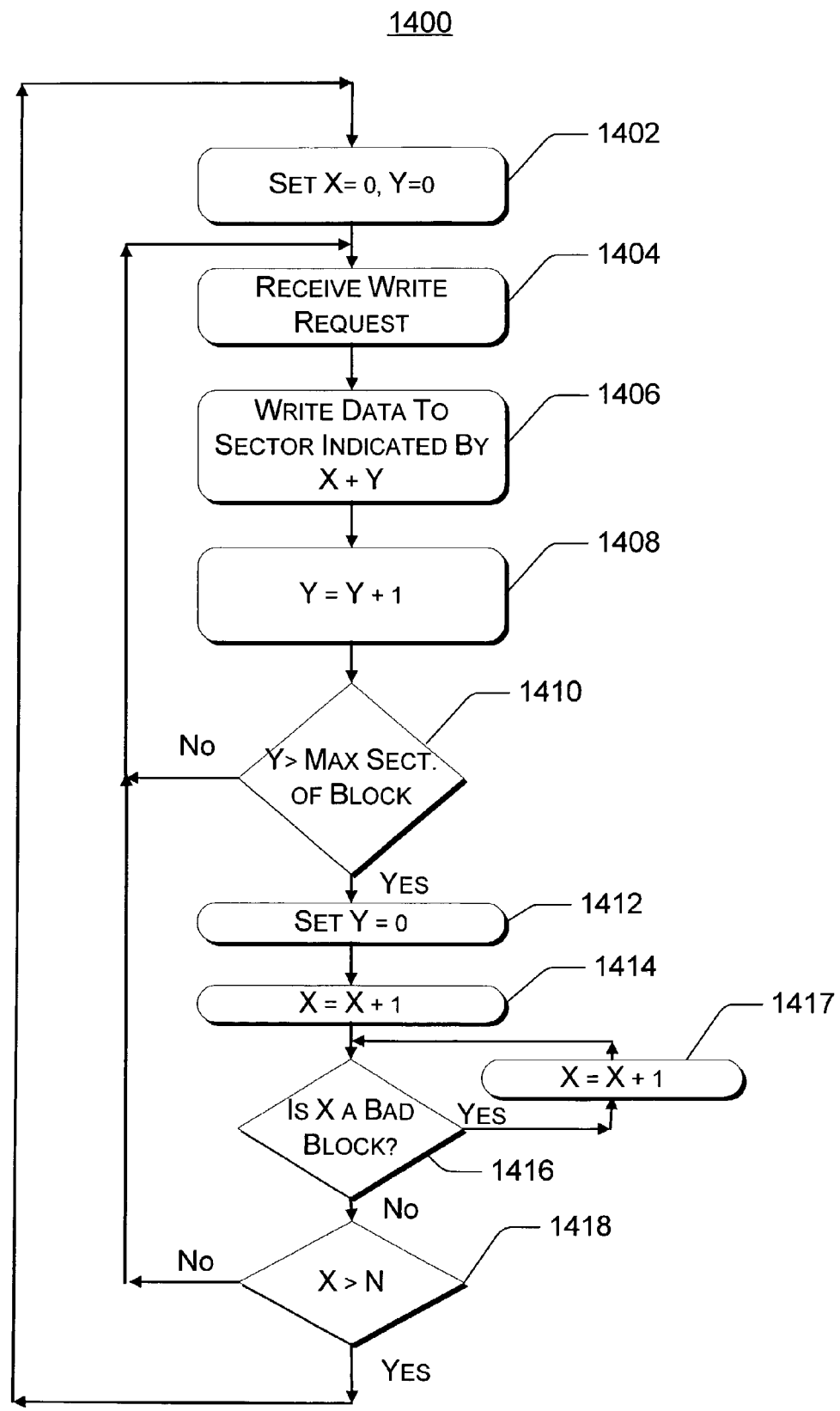
FIG. 14 illustrates a method used by a sector manager to determine the next available free sector location for the file system to store data on the flash medium.

FIG. 14 illustrates a method 1400 used by the sector manager 704 to determine the next available free sector location for the file system 600 to store data on the flash medium. Method 1400 also enables the sector manager 704 to provide each physical sector address (for the next free sector) for assignment to each logical sector address write request by file system 600 as described above. Method 1400 includes blocks 1402–1418. The order in which the method is described is not intended to be construed as a limitation. Furthermore, the method can be implemented in any suitable hardware, software, firmware, or combination thereof.

At block 1402, the X block counter 1304 and Y sector counter 1306 are initially set to zero. At this point it is assumed that no data resides on the medium 601.

At block 1404, media interface layer 608 receives a write request and the sector manager 704 is queried to send the next available free physical sector address to the logical-to-physical sector mapping module 706.

At block 1406, the data is written to the sector indicated by the write pointer 1302. Since both counters are initially set to zero in this exemplary illustration, suppose that the write pointer 1302 points to sector zero, block zero.

At block 1408, the sector counter 1306 is advanced one valid sector. For example, the write pointer advances to sector one of block zero, following the example from step 1406.

Next, in decisional block 1410, the sector manager 704 checks whether the sector counter 1306 exceeds the number of sectors K in a block. If the Y count does not exceed the maximum sector size of the block, then according to the NO branch of decisional block 1410, blocks 1404–1410 repeat for the next write request.

On the other hand, if the Y count does exceed the maximum sector size of the block, then the highest physical sector address of the block was written to and the block is full. Then according to the YES branch of block 1410, the Y counter is reset to zero as indicated at block 1412. Next, in block 1414, X block counter 1304 is incremented by one, which advances the write pointer 1302 to the next block at the lowest valid physical sector address, zero, of that block.

Next, in decisional step 1416, the compactor module 708 checks whether the X block counter is pointing to a bad block. If it is, X block counter 1304 is incremented by one. In one implementation, the compactor 406 is responsible for checking this condition. As mentioned above, the sector manager stores all of the physical sector addresses that are free to handle a write request. Entire blocks of physical sector addresses are always added by the compactor during a compaction or during initialization. So, the sector manager 704 does not have to check to see if blocks are bad, although the sector manager could be implemented to do so. It should also be noted that in other implementations block 1416 could be performed at the start of method 1400.

In block 1417, the X block counter 1304 is incremented until it is pointing to a good block. To avoid a continuous loop, if all the blocks are bad, then method 1400 stops at block 1416 and provides an indication to a user that all blocks are bad.

Next in decisional block 1418, the sector manager checks whether the X II block counter 1304 exceeds the maximum numbers of blocks N. This would indicate that write pointer 1302 has arrived full circle (at the top of circle 1200). If that is the case, then according to the YES branch of block 1418, method 1400 repeats and the X and Y counter are reset to zero. Otherwise, according to the NO branch of block 1418, method 1400 returns to block 1404 and proceeds.

In this exemplary method 1400, the write pointer 1302 initially starts with the lowest physical sector address of the lowest addressed block. The write pointer 1302 advances a sector at a time through to the highest physical sector address of the highest addressed block and then back to the lowest, and so forth. This continuous and circular method 1400 ensures that data is written to each sector of the medium fairly and evenly. No particular block or sector is written to more than any other, ensuring even wear-levels throughout the medium. Accordingly, method 1400 permits data to be written to the next available free sector extremely quickly without expensive processing algorithms used to determine where to write new data while maintaining even wear-levels. Such conventional algorithms can slow the write speed of a computer device.

In an alternative implementation, it is possible for the write pointer 1302 to move in a counter clock wise direction starting with highest physical sector address of the highest block address N and decrement its counters. In either case, bad blocks can be entirely skipped and ignored by the sector manager. Additionally, the counters can be set to any value and do not necessarily have to start with the highest or lowest values of the counters.

Figure 15:
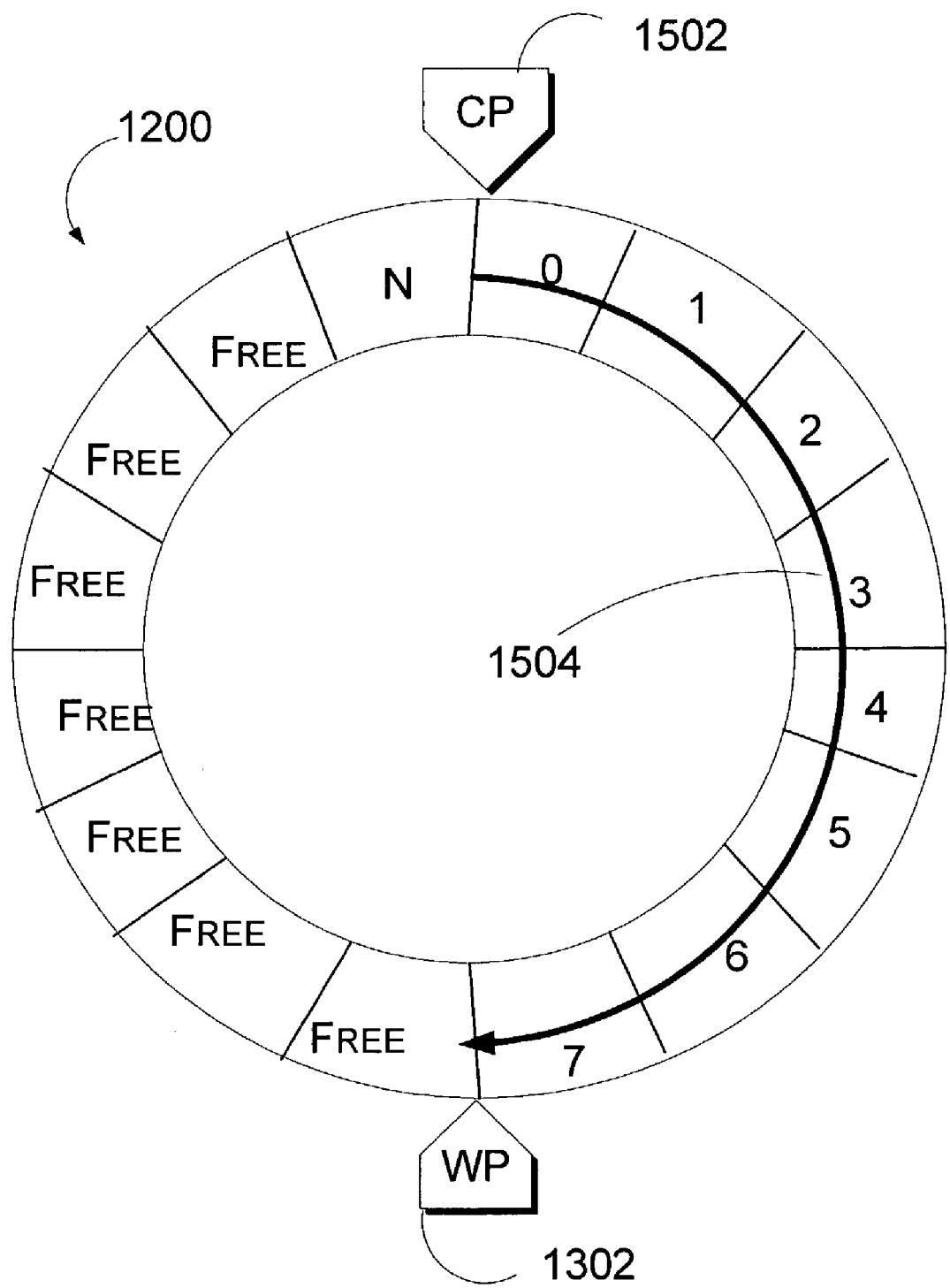
FIG. 15 illustrates another view of a flash memory medium viewed as a continuous circle.

FIG. 15 illustrates another view of media 601 viewed as a continuous circle 1200. As shown in FIG. 15, the write pointer 1302 has advanced through blocks 0 through 7 and is approximately half way through circle 1200. Accordingly, blocks 0 through 7 contain dirty data. That is, each good sector in blocks 0 through 7 is not free, and therefore, not available to receive new or modified data. Arrow 1504 represents that blocks 0 through 7 contain used sectors. Eventually, the write pointer 1302 will either run out of free sectors to write to unless sectors that are marked dirty or are not valid are cleared and recycled. To clear a sector means that sectors are reset to a writable state or in other words are "erased." In order to free sectors it is necessary to erase at least a block at a time. Before a block can be erased, however, the contents of all good sectors are copied to the free sectors to a different portion of the media. The sectors are then later marked "dirty" and the block is erased.

The compactor module 708 is responsible for monitoring the condition of the medium to determine when it is appropriate to erase blocks in order to recycle free sectors back to the sector manager 704. The compactor module 708 is also responsible for carrying out the clear operation. To complete the clear operation, the compactor module 708 like the sector manager 704, maintains a pointer. In this case, the compactor module 708 maintains a clear pointer 1502, which is shown in FIG. 15. The clear pointer 1502 points to physical blocks and as will be explained enables the compactor module 708 to keep track of sectors as the medium as blocks are cleared. The compactor module 708 can maintain a pointer to a block to compact next since an erase operation affects entire blocks. That is, when the compactor 406 is not compacting a block, the compactor module 708 points to a block.

In the event of power failure, the media abstraction layer 606 contains simple coded logic that scans the flash memory medium 601 and determines what locations are marked free and dirty. The logic is then able to deduce that data 1504 resides between the locations marked free and dirty. A head (write pointer) and tail (clear pointer 1502) of the data (also referred to as a data stream 1504) is easily determined by locating the highest of the physical sector addresses containing data for the head and by locating the lowest of the physical sector addresses containing data for the tail.

Power Failure Detection and Correction

A power failure can detrimentally affect the data (e.g., files) integrity of a file system, in a computer that uses flash media to store the data. For instance, suppose that a user of a computer is attempting to store data and has just performed a task that issues a data request. In this scenario the data request is to write data to the flash medium, but unfortunately the user accidentally drops the computer disconnecting the power source. When the user reconnects the battery, will the file system know that a power failure event occurred? What will happen to the data that the user was attempting to store? Did the data get stored on the medium? Does the file system know that the data was stored on the medium? Perhaps the data was just partially stored? How will the file system know whether more data was expected? How will the file system recover from the power failure event and still preserve data integrity for the computer? How will the file system recover from the power failure event quickly and efficiently?

The media abstraction layer 606 can be implemented with functionality to detect a power failure event after a computer is initialized (e.g., the computer is turned-on from a powered-off state or rebooted). The media abstraction layer 606 can also be implemented with functionality to correct for corrupt data such as partial data stored on the flash medium as a result of write operation interrupted by a power failure event. In particular, the power failure manager module 710 efficiently detects a power failure event. It also ensures that data integrity is preserved, even for the last physical sector to receive data just prior to the power failure event, including any accompanying meta-information.

Figure 16:
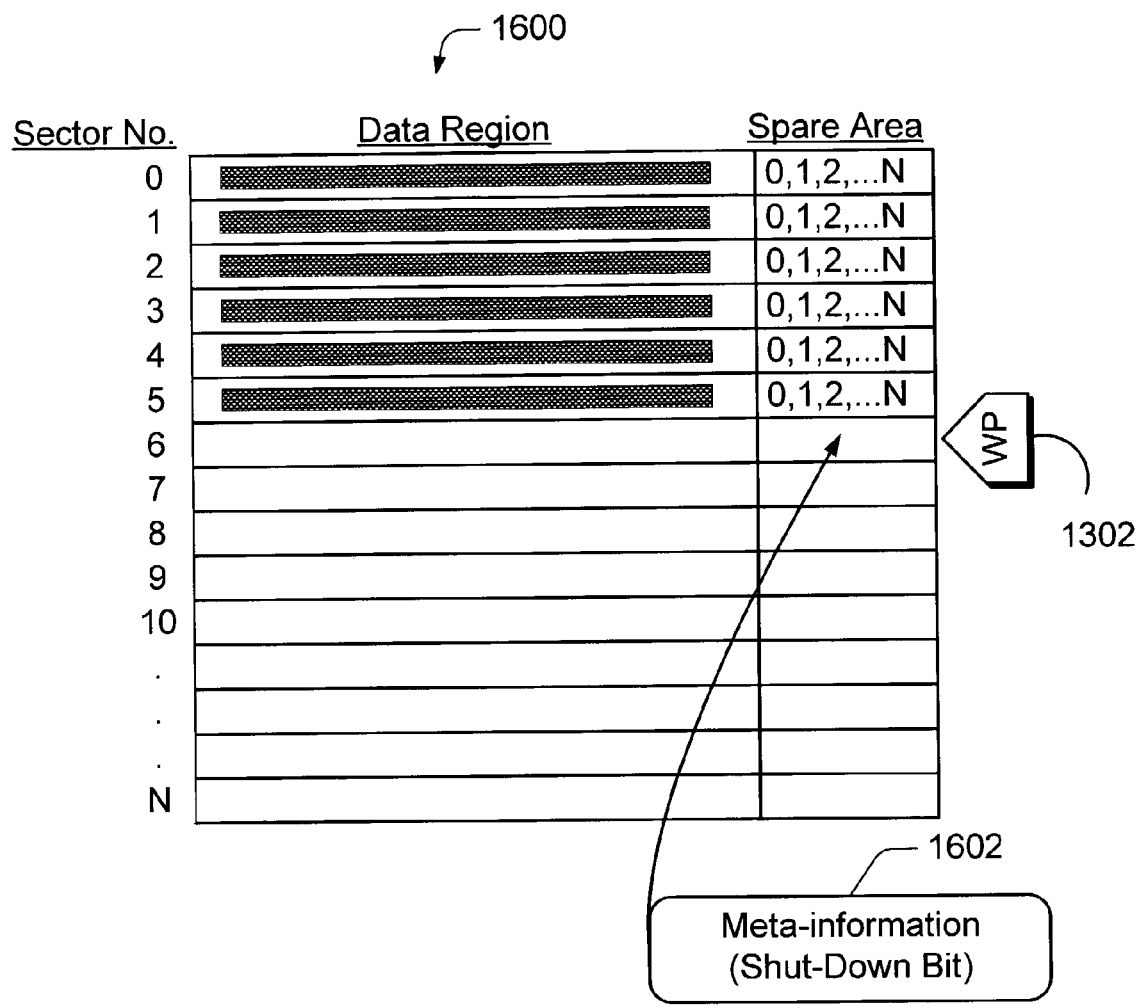
FIG. 16 shows how the file system stores meta-information on a flash medium when a computer shuts-down (e.g., powers-off or reboots) according to a normal shutdown mode to safeguard against a power failure event.

FIG. 16 shows how power failure manager module 710 stores meta-information 1602 on a flash medium 1600 when a computer shuts-down (e.g., powers-off or reboots) according to a normal shutdown mode. In the exemplary implementation, the meta-information 1602 is a bit in the spare area designated as the "shutdown bit", which could by any bit 1-to-N. Alternatively, the meta-information 1602 could take other forms such as more than one bit and could be stored in other regions of the physical sector.

When the computer 100 shuts-down in a normal shutdown mode (as opposed to shutting abnormally because of a power failure event), the power failure manager module 710 stores meta-information 1602 in a physical sector indicated by write pointer 1302. The location of the write pointer 1302 is relative and advances in circular fashion as described above. Accordingly, the meta-information 1602 can be stored in any valid physical sector of the flash medium indicated by the write pointer at the time of a normal shutdown.

Now, when the computer 100 initializes, the power failure manager module 710 simply scans the physical sector indicated by the write pointer 1302 to ascertain whether the meta-information 1602 is present. If the meta-information 1602 is present, the computer previously shutdown according a normal shut down mode. If the meta-information is not found, then a conclusion is made by the power-failure manager 710 that the computer did not shut-down properly due to some type of catastrophic event such as power failure.

Figure 17:
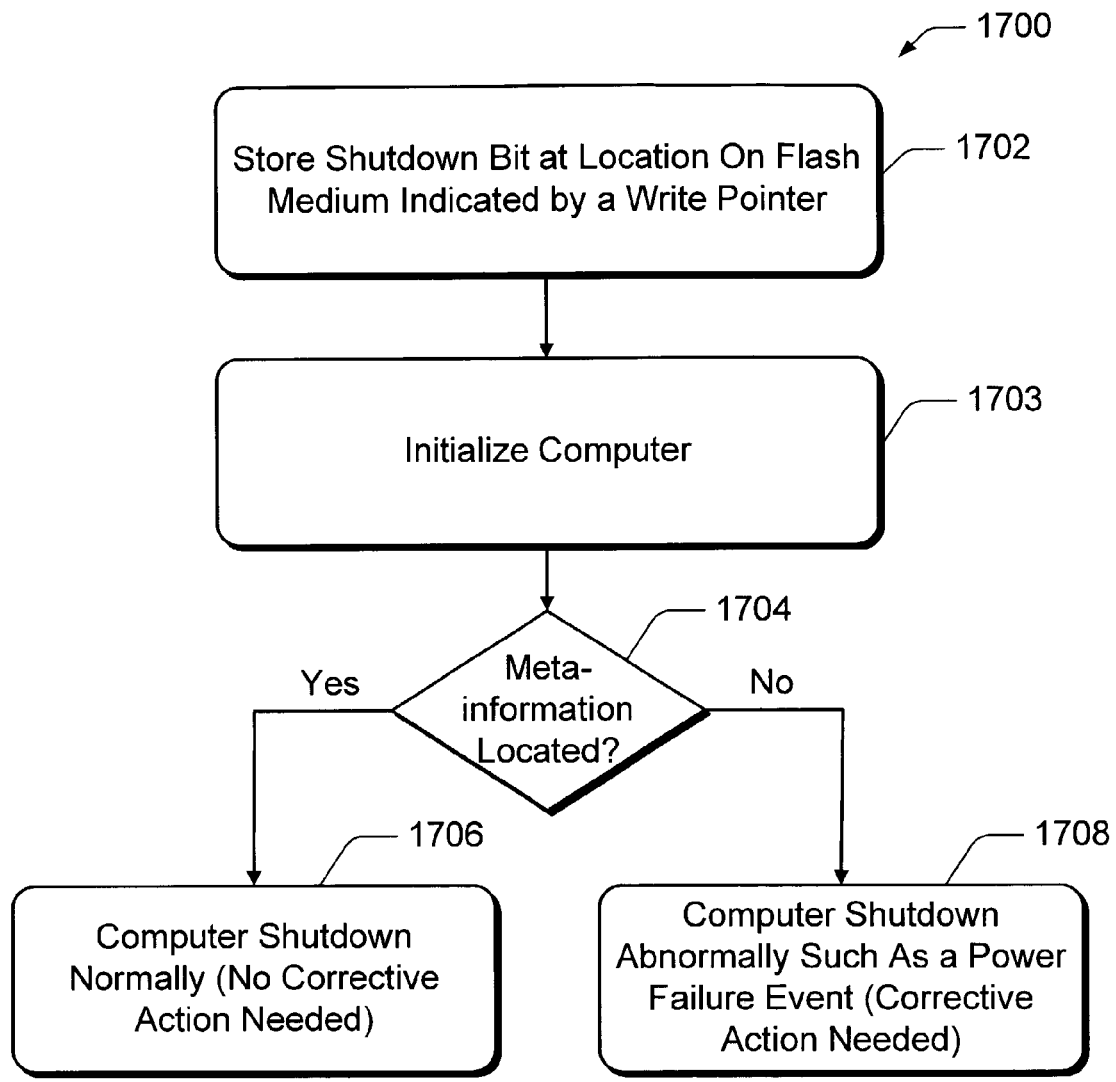
FIG. 17 is a method for detecting a power failure event.

FIG. 17 is a method 1700 for detecting power failure. Method 1700 includes blocks 1702 through 1708. The order in which the method is described is not intended to be construed as a limitation. Furthermore, the method can be implemented in any suitable hardware, software, firmware, or combination thereof.

At block 1702, meta-information such as a shut-down bit is stored at a location on a flash medium indicated by a write pointer if a computer shuts-down according to a normal shutdown mode. For example, if computer 100 shown in FIG. 16 shuts down normally, then the media abstraction layer 606 will store meta-information in the spare area of a physical sector indicated by write pointer 1302 of the flash medium 1600. At a block 1703, the computer 100 is initialized or rebooted. The computer may have been reactivated after a power-failure event, system reboot, or any other situation where the computer is deactivated.

At a decisional block 1704, during initialization of the computer, a check is made whether the meta-information is present in the location on the flash medium indicated by the write pointer. For example, referring to FIG. 16, when computer 100 (shown in FIG. 1) is rebooted or turned-on, the media abstraction layer 606 checks the physical sector indicated by the write pointer 1302 for the meta-information 1602.

Referring back to FIG. 17, if according to the Yes branch of decisional block 1704 the meta-information is present in the physical sector indicated by the write pointer, then according to block 1706 a conclusion is made that the computer shutdown according to a normal mode and no corrective action is needed.

On the other hand, if according the No branch of decisional block 1706 the meta-information is not present in the physical sector indicated by the write pointer 1302, then according to block 1708 a conclusion is made that the computer did not shutdown according to the normal shutdown mode, e.g., a power failure event occurred.

Figure 18:
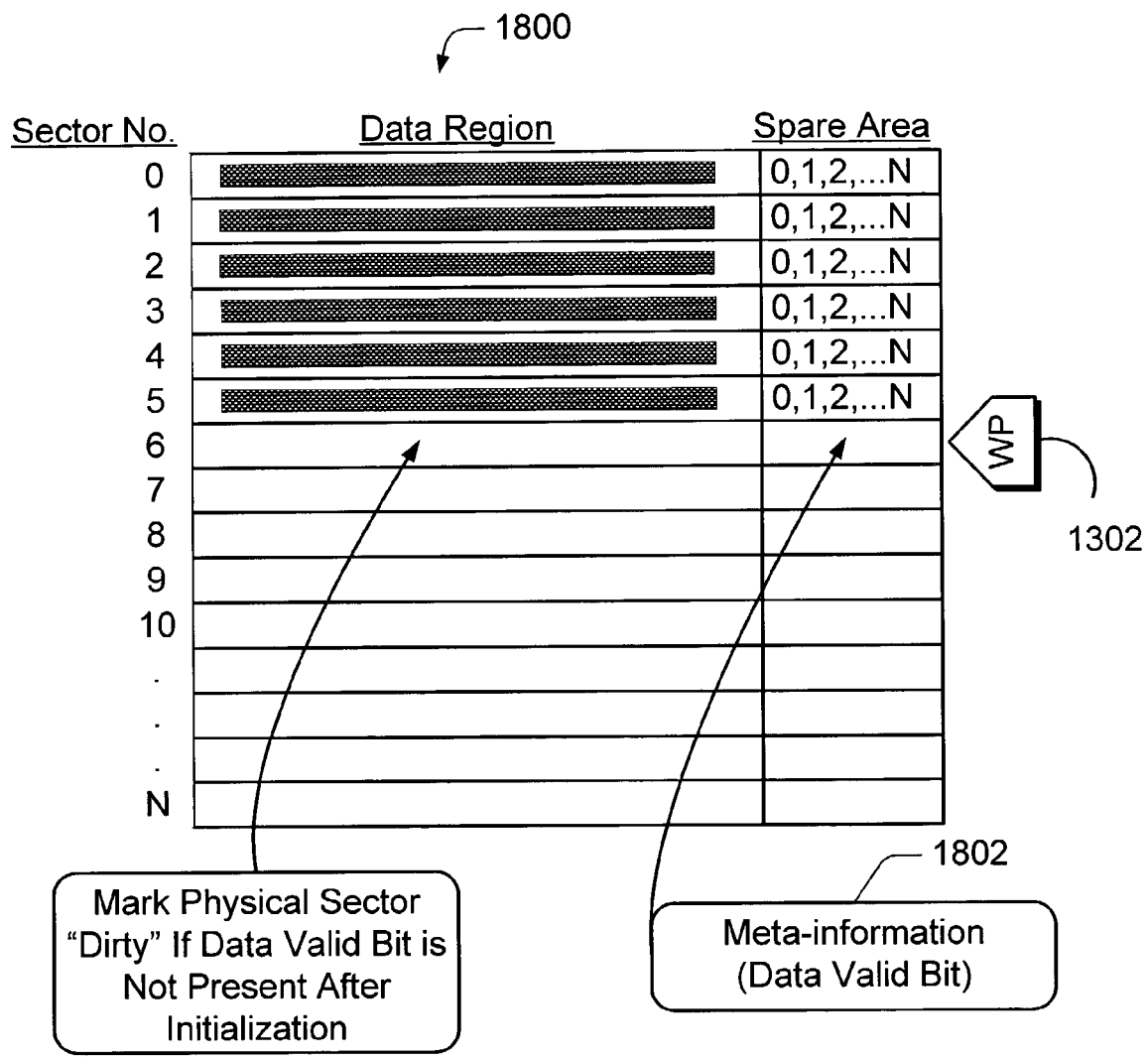
FIG. 18 shows how the file system stores meta-information on the flash medium to safeguard against partial data being written to a physical sector of the medium due to a power failure event.

With respect to a power-failure, the media abstraction layer 606, is also responsible for ensuring that data integrity is maintained on a physical sector basis. As described above, power failure can occur at any time and to ensure data integrity, it is important to prevent partial sector writes. Accordingly, FIG. 18 shows how power failure manager module 710 stores meta-information 1802 on the flash medium 1800 to safeguard against a partial sector write. In this example, power failure manager module 710 stores meta-information in the form of a "data valid bit." The "data valid bit" could be any bit 1-to-N in the spare area that is set active after completion of each write operation to a particular sector. Alternatively, the meta-information 1602 could take other forms and could be stored in other regions of the physical sectors.

Typically, the data valid bit is the last bit "N" in the spare area of a physical sector to be written after completion of a write operation. Because the data valid bit is the last bit written in each physical sector, if the bit is not found in a physical sector indicated by the write pointer, then the media abstraction layer 606 can conclude that the physical sector contains corrupt data. As a result, the media abstraction layer 606 marks the sector as "dirty." File system 600 will not use the data in this physical sector. Again, the write pointer 1302 is used to locate the last sector written to prior to initialization.

The media abstraction layer 606, by using the data valid bit meta-information, ensures a physical sector is not corrupt due to an incomplete write. Hence, data integrity at the sector level is guaranteed in the event of a power failure event. Moreover, the "dirty sector" will later be reclaimed by the compactor and no additional clean-up is necessary. Thus, the amount of data potentially lost during a power-failure event is minimized to a single sector.

Figure 19:
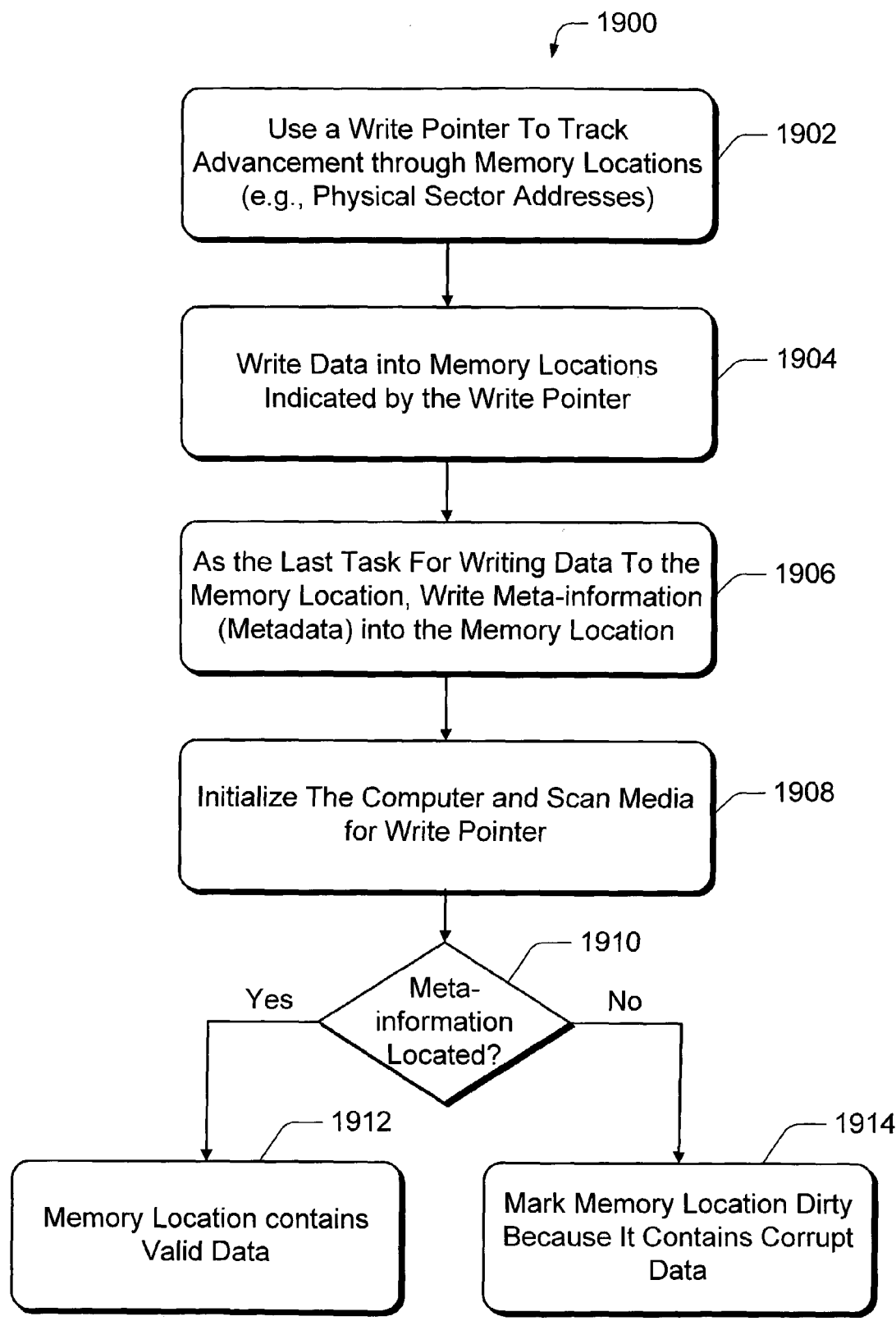
FIG. 19 is a method for ensuring data integrity in the event of a power-failure event.

FIG. 19 is a method 1900 for ensuring data integrity in the event of power-failure event. Method 1900 includes blocks 1902-1916. The order in which the method is described is not intended to be construed as a limitation. Furthermore, the method can be implemented in any suitable hardware, software, firmware, or combination thereof.

At block 1902, a write pointer is used to advance through a circular sequence of memory locations in the flash medium indicating a memory location that is available to receive data as the write pointer advances. At block 1904, data is written into the memory location (such as a physical sector) indicated by the write pointer.

At block 1906, meta-information (also referred to as metadata) is written into the memory location indicated by the write pointer as the last item written into the physical sector. For example, a data valid bit is written into the spare area of a physical sector. If functionality performed in blocks 1904 or 1906 is interrupted prior to being completed, then the meta-information will not have a chance to be written into the memory location. This will serve as an indicator that there is corrupt data in the memory location, because either no or only partial data has been written into the memory location prior to the occurrence of the interrupting event.

At block 1908, the computer is initialized (e.g., powered-on or rebooted) and the file system scans the media for the write pointer. At decisional block 1910, the memory location indicated by the write pointer is searched to determine whether the meta-information, such as the data valid bit is present.

If according to the Yes branch of decisional block 1910, the meta-information is located in the memory location indicated by the write pointer, then according to block 1912 the memory location (e.g., physical sector) is deemed to include valid data. If according to the No branch of decisional block 1910, meta-information is not located in memory location indicated by the write pointer, then according to block 1914 the memory location is deemed to include partial or invalid data and the memory location is marked "dirty."

Alternatively, the data valid bit can also be used to detect a power failure. That is if the data valid bit is not located in the physical sector indicated by the write pointer after computer 100 is initialized, then the media abstraction layer 606 can deduce that a power failure event occurred.

Transaction Support, Transaction Log

To ensure that file system 600 maintains consistency during a power-failure event, the media abstraction layer 606 can be implemented to record and maintain a transaction log. In particular, the transaction log module 712 can be configured to maintain a log of transactions performed by the file system 600. A transaction log generally serves as a history journal of transactions performed by the file system over a period of time that can be read back in the event there is a power failure to ensure integrity of directories stored on the flash medium. These transactions include creating files, deleting files, copying files, reading files, creating directories, creating subdirectories, and other related file tasks.

Most current file systems reserve a fixed region of the flash medium to store log information. For example, a file system may reserve 10 MB of the flash medium at a particular fixed region on the flash medium exclusively for storing transaction log data. Unfortunately, this design has several drawbacks. Reserving too little space for the fixed region can slow down the speed of the file system, because only a finite number of user requests can operate concurrently. On the other hand, reserving too much space impacts the amount of user data that can be stored on the media. Additionally, fixing the transaction log in a particular region of the flash memory can create a host of problems, the worst being that this fixed flash region has a greater potential for going "bad" or being worn out over time, which can cause a catastrophic failure for the entire flash medium.

Figure 20:
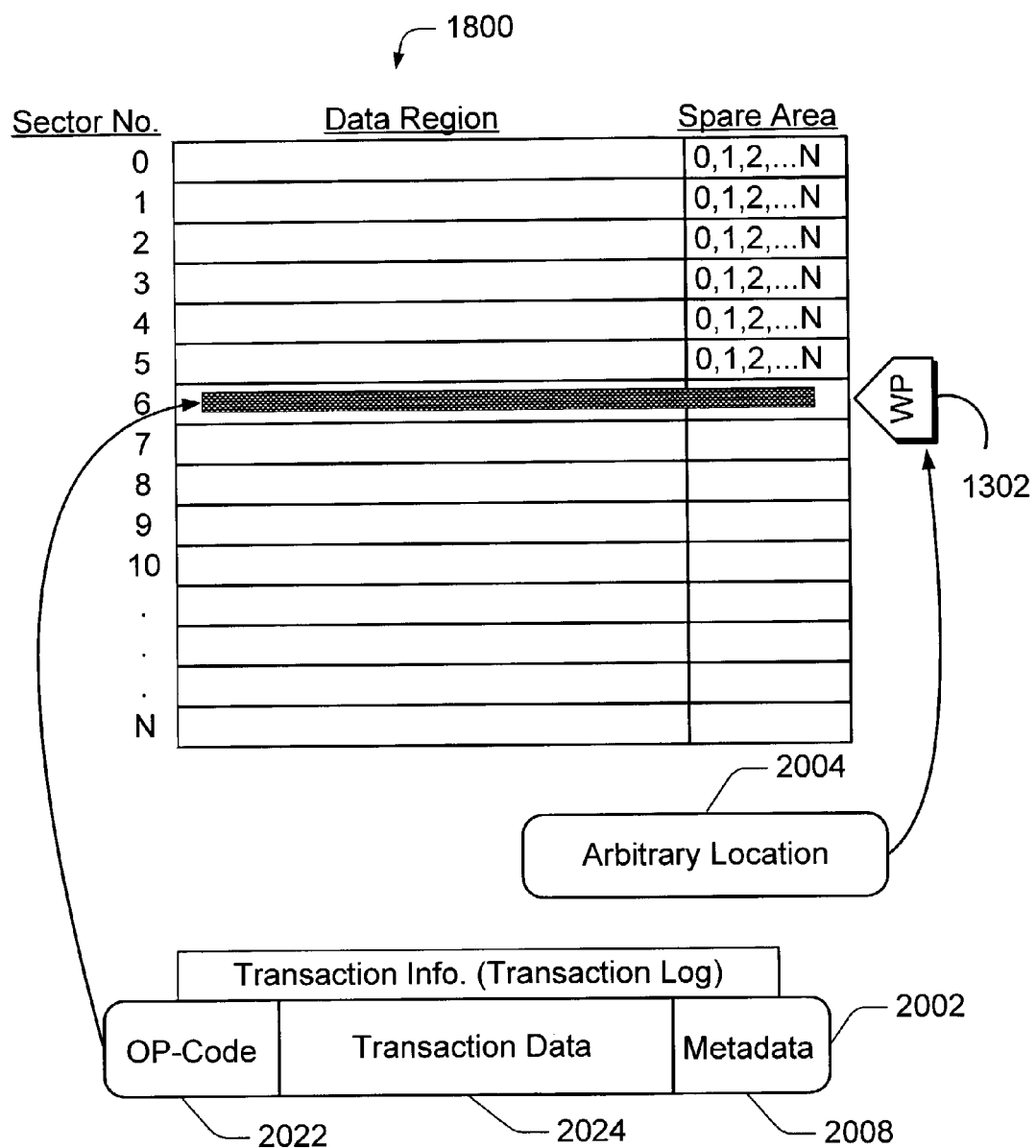
FIG. 20 shows transaction information stored at an arbitrary location on a flash medium.

To overcome these problems, the media abstract layer 606 permits transaction logs to be placed at arbitrary places on the flash medium. For example, FIG. 20 shows transaction information 2002 stored at an arbitrary location 2004 on a flash medium 2000 indicated by write pointer 1302. As used herein "arbitrary location" means any arbitrary physical sector address associated with the physical sectors in which transaction information 2002 is stored and includes potentially all valid physical sector addresses on the flash medium. In other words, one or more transaction logs are not restricted to a fixed region of physical sector addresses on the flash medium. Although reference may be made herein to a singular transaction log for discussion purposes only, it is possible to store multiple transaction logs and different types of transactions logs at arbitrary locations on the flash medium.

When the media abstraction layer 606 receives requests to perform a file transaction, the transaction log module 712 stores transaction information associated with performing the file transaction at the next available free physical sector on the medium. In other words, the transaction log module 712 stores transaction information 2002 associated with performing a file request at the physical sector address on the medium indicated by the write pointer 1302. The transaction information includes operation code 2022, transaction data 2024, and metadata 2008.

Operational code 2022 is typically stored at the beginning of the data portion of a physical sector, although the operational code 2022 could be stored at other locations within the physical sector. The operational code 2022 is a number used to indicate what type of action is associated with a pending transaction (i.e., delete file, create file, open file, etc.). In the exemplary implementation, the operational code is four bytes, but could include more than four bytes if necessary. The rest of the data 2024 in the physical sector address is associated with the particularities of the transaction such as the name of directory or file, and other more specific information.

The transaction information 2002 further includes metadata 2008 indicating that the arbitrary physical sector address contains transaction information 2002. The metadata 2008 in the exemplary implementation is stored in the spare area of the flash medium, but could be stored in other regions of the physical sector. In particular, transaction log metadata could be any of the one or more bits 0, 1, 2, . . . , N in the spare area of the physical sector used to uniquely identify the physical sector as containing transaction information 2002. Thus, the transaction log metadata 2008 permits any physical sector(s) to be readily identified from other physical sector containing data, as a physical sector that contains transaction information.

Thus, file system 600 can identify the arbitrary physical sector addresses that contain transaction information 2002, from the transaction log metadata 2008. The file system can identify the physical sector addresses at initialization. The media abstraction layer 606 scans the spare areas and checks for the presence of transaction log metadata 2008 to identify and locate which physical sector addresses corresponding to physical sectors contain transaction information 2002.

Accordingly, the amount of space needed for transaction logs is not fixed. File system 600 can continue to create transaction logs if there is free space on the medium. Thus, size requirements for transaction logs dynamically adapt to the run-time behavior of the file system. The media abstraction layer is able to avoid the host of problems mentioned above by storing transaction information at arbitrary locations. At boot time (e.g., initialization), no more time is needed to identify sectors containing transaction logs, because the spare area is scanned for other information relevant to other parameters.

Open transaction logs can be "closed" after a transaction is successfully completed by marking the physical sector containing the transaction data dirty. For example, when the file system receives an indication that a transaction has been completed by the media interface layer 608, the physical sector is marked dirty and will later be recycled by the compactor module 708. If after initialization, open transaction logs are located, then file system 600 deduces that these transactions were not performed. Accordingly, file system 600 completes all pending transactions stored in physical sectors not marked "dirty" and the one or more transaction logs associated with transaction operations are closed. This is referred to as transaction log playback and is particularly useful to ensure data integrity after a power-failure event.

Figure 21:
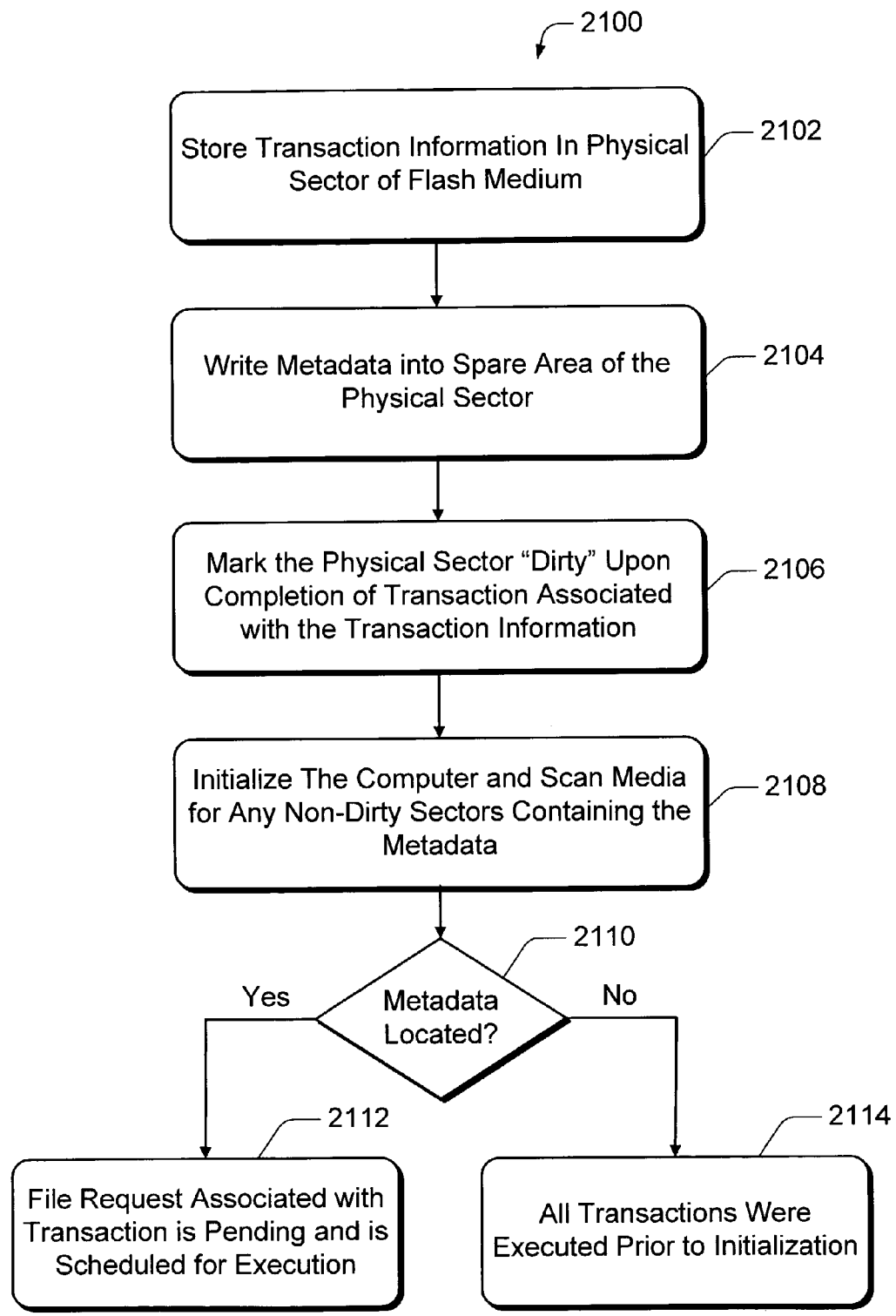
FIG. 21 shows a method for implementing a transaction log and the ability to recover transactions in the event of a power-failure event through transaction playback.

FIG. 21 shows a method 2100 for implementing a transaction log and the ability to recover transactions in the event of a power-failure event through transaction playback. Method 2100 includes blocks 2102 through 2114. The order in which the method is described is not intended to be construed as a limitation. Furthermore, the method can be implemented in any suitable hardware, software, firmware, or combination thereof.

In block 2102, a transaction log is stored at an arbitrary physical sector address of flash medium. For example, transaction information associated with performing a file request is stored at any location indicated by the write pointer. This transaction log and other potential transaction logs are not restricted to fixed locations on the medium.

In block 2104, metadata is written into a spare area of the physical sector containing the transaction information. The metadata indicates that the physical sector contains transaction information. The metadata can take many forms and is not necessarily restricted to the spare area of the physical sector.

In block 2106, the physical sector containing the transaction information is marked "dirty" when the file system completes the transaction associated with the transaction information stored in the sector. If the transaction is not completed then the physical sector is not marked dirty. In block 2108, the computer is initialized. The computer may have been reactivated after a power-failure event, system reboot, or any other situation where the power source to the computer was deactivated.

In a decisional block 2110, all the physical sectors not marked dirty are scanned to determine whether any file requests are pending by virtue of the metadata.

If according to the Yes branch of decisional block 2110 one or more file requests are found to be pending, then in block 2112 the file system recognizes that the one or more transactions stored in each respective physical sector is pending and has not been completed. Accordingly, the file system can schedule that the data request be attempted again (in the event there was a power failure event that interrupted the data request from being accomplished).

If according to the No branch of decisional block 2110 no requests are located, then according to block 2114 a conclusion is made that the all transactions were completed prior to initialization.

Free Space Management

Figure 22:
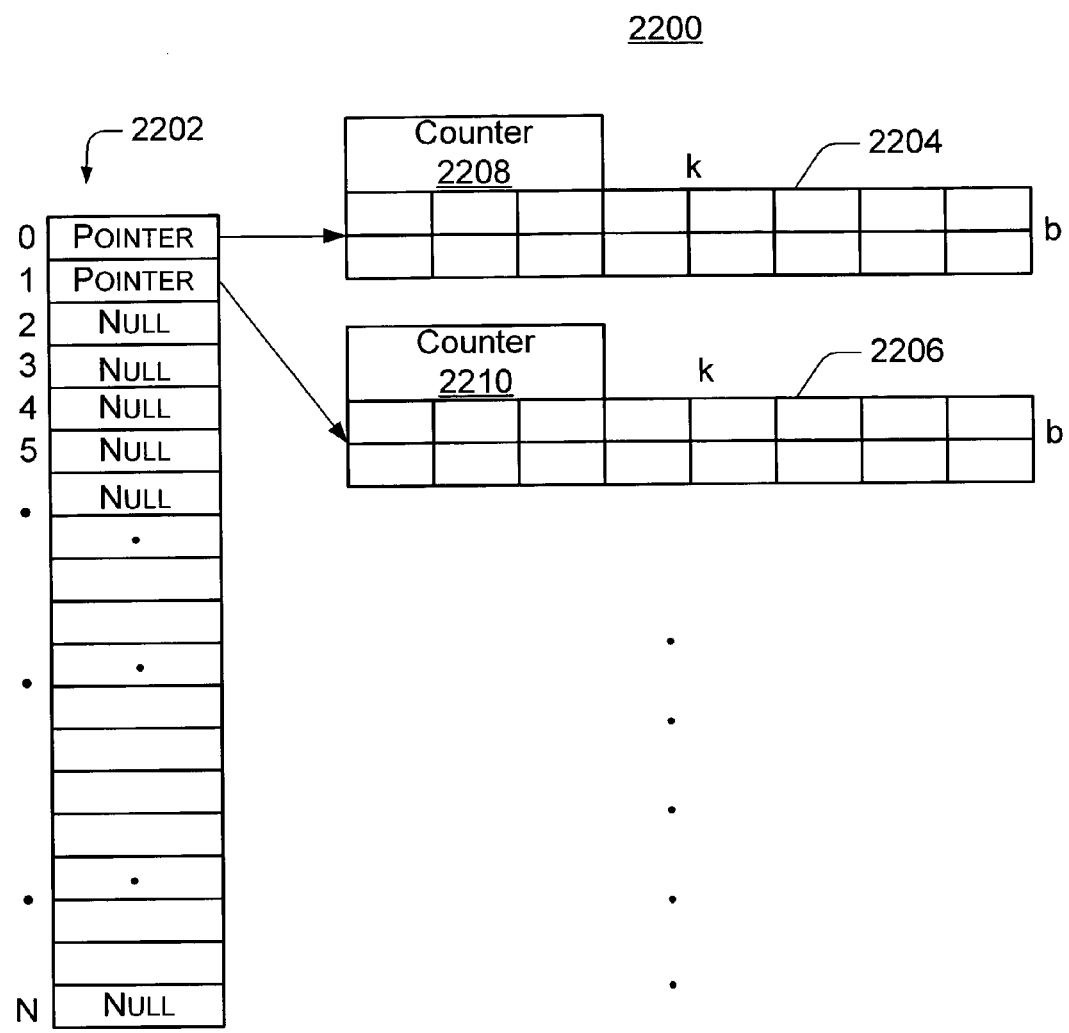
FIG. 22 illustrates a dynamic look-up data structure used to track data stored in the flash memory medium.

FIG. 22 illustrates a dynamic look-up data structure 2200 to track data stored in the flash memory medium. Data structure 2200 includes a master data structure 2202, one or more secondary data structures 2204, 2206, and one or more counters 2208, 2210.

The data structures and counters are generated and maintained by file system 600, but can also be generated and maintained by other software systems including the operating system, program applications, drivers, and other related systems. The data structures and counters are stored in a volatile portion of memory 106 (referring to computer 100 of FIG. 1), but could also be stored in non-volatile memory.

The one or more secondary data structures 2204, 2206 contain mappings of logical-to-physical sector addresses. Each of the secondary data structures 2204, 2206 has a predetermined capacity of mappings. The master data structure 2202 contains a pointer to each of the one or more secondary data structures 2204, 2206. Each secondary data structure is allocated on an as needed basis for mapping those logical-to-physical addresses that are used to store data. Once the capacity of a secondary data structure 2204, 2206, et cetera, is exceeded another secondary data structure is allocated, until eventually all possible physical sector addresses on the flash medium are mapped to logical sector addresses. Each time a secondary table is allocated, a pointer contained in the master data structure 2202 is enabled by the file system 600 to point to it.

Each counter 2208, 2210 is associated with a respective secondary data structure 2204, 2206. Each counter 2208, 2210, provides an indication of when each of the one or more secondary data structures 2204, 2206, respectively, reaches the predetermined capacity of mappings. For example, in one implementation suppose that each secondary data structure can map K logical-to-physical sector addresses. Accordingly, each counter (such as 2208, 2210) is initialized to K when the associated secondary data structure is created (e.g., such as 2204, 2206, respectively). Now, each time the file system writes to a new logical sector address in one of the secondary data structures, the counter associated with that secondary data structure is decremented. On the other hand, each time the file system indicates that a logical sector address is no longer needed (such as delete file operation) the counter associated with that secondary data structure is incremented. Alternatively, the counter could be initialized at zero and incremented each time a logical sector address is added and decremented each time a logical sector address is removed. In this alternative counting method, when the counter reaches K, this would indicate that the secondary data structure is full and an additional secondary data structure needs to be allocated.

The media abstraction layer 606 can use the counters (count variables maintained by each of the counters) to track free sectors. If the media abstraction layer 606 finds that a count variable equals zero for a particular counter, then the media abstraction layer 606 does not need to search through the secondary mappings in the associated secondary data structure for a free location when creating a new logical sector address. The counter permits the media abstraction layer 606 to avoid unnecessarily searching a secondary data structure to find a free logical sector when the counter indicates that the secondary data structure is full, i.e., reached the predetermined capacity of mappings for that secondary data structure. As the number of logical-to-physical sector address mappings increases, the counters will increasingly assist in reducing search space required by the media abstraction layer. The counters will also speed up the process of locating free space and allocating secondary data structures.

Accordingly, file system 600 dynamically allocates one or more secondary data structures based on the amount of permanent data stored on the flash medium itself. The size characteristics of the secondary data structures are computed at run-time using the specific attributes of the flash memory medium. Secondary data structures are not allocated unless the secondary data structure previously allocated is full or insufficient to handle the amount of logical address space required by the file system. Dynamic look-up data structure 2200, therefore, minimizes usage of memory. Dynamic look-up data structure 2200 lends itself to computer devices 100 that use calendars, inboxes, documents, etc. where most of the logical sector address space will not need to be mapped to a physical sector address. In these applications, only a finite range of logical sectors are repeatedly accessed and new logical sectors are only written when the application requires more storage area.

The master data structure 2202 contains an array of pointers, 0 through N that point to those secondary data structures that are allocated. In the example of FIG. 22, the pointers at location 0 and 1 point to secondary data structures 2204 and 2206, respectively. Also, in the example illustration of FIG. 22, pointers 2 through N do not point to any secondary data structures and would contain a default setting, "NULL", such that the logical-to-physical sector mapping module 706 knows that there are no further secondary data structures allocated.

In each secondary data structure 2204, 2206 only a portion of the total possible medium is mapped in the secondary data structures. The secondary data structures permit the file system to reduce the amount space needed in memory to only those portions of logical sectors addresses issued by the file system. Each secondary data structure is (b*k) bytes in size, where k is the number of physical sector addresses contained in the data structure and b is the number of bytes used to store each physical sector address.

Figure 23:
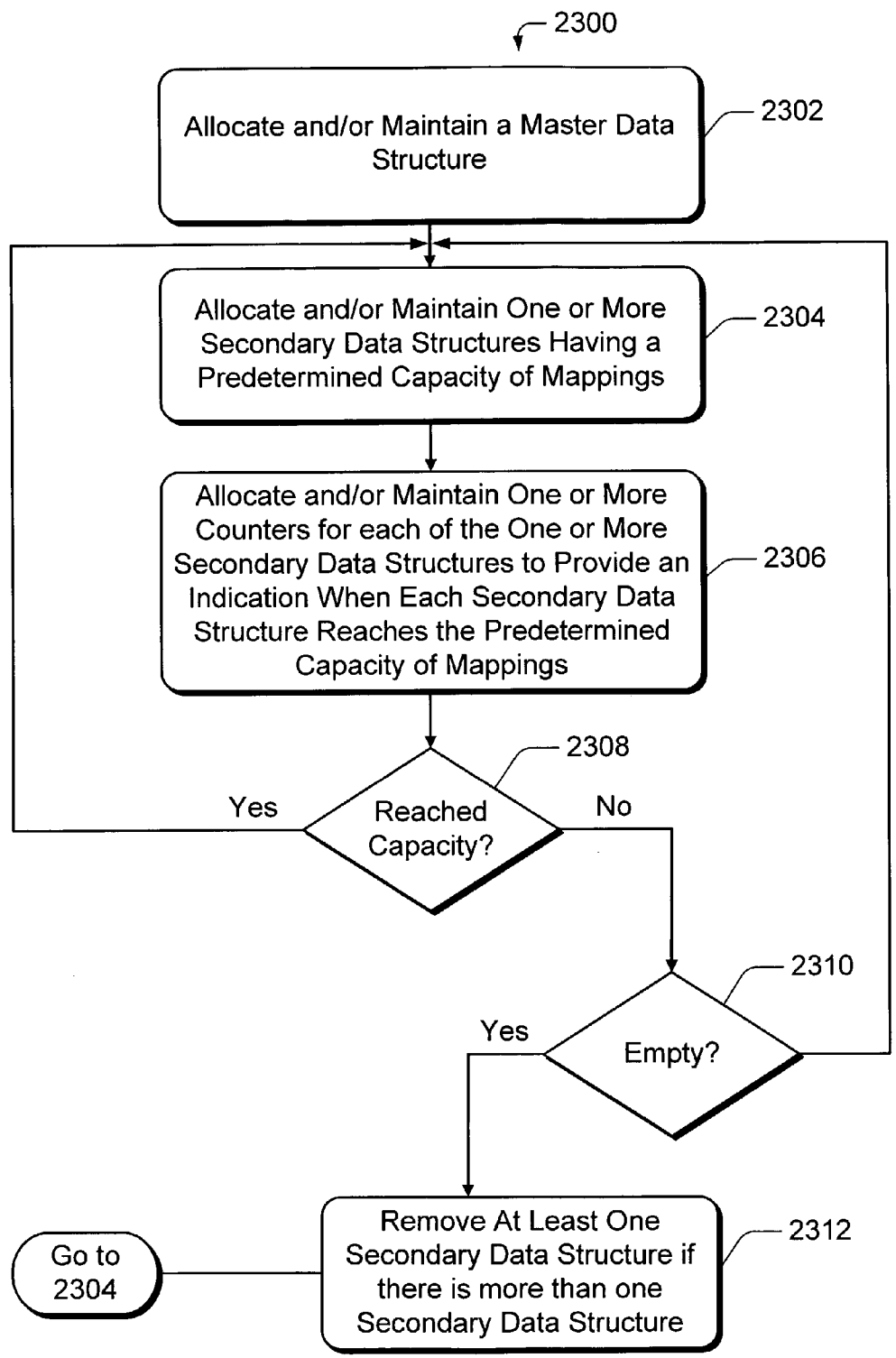
FIG. 23 illustrates a method for dynamically allocating look-up data structures for tracking data on the flash memory medium.

FIG. 23 illustrates a method 2300 for dynamically allocating look-up data structures for tracking data on the flash memory medium. Method 2300 includes blocks 2302 through 2312. The order in which the method is described is not intended to be construed as a limitation. Furthermore, the method can be implemented in any suitable hardware, software, firmware, or combination thereof.

In block 2302, a master data structure containing the pointers to one or more secondary data structures is allocated and/or maintained. The master data structure in this exemplary implementation is fixed in size. At the time a computer initializes, the size of the flash memory medium used to store data is determined. Based on the size of the flash medium, the media abstraction layer calculates a range of physical addresses. For example, suppose the size of the flash medium is 16 MB, then a NAND flash medium 400 will typically contain 32768 sectors each 512 bytes in size. This means that the media abstraction layer 606 may need to map a total of 0 through 32768 logical sectors in a worse case scenario, assuming all the memory space is used on the flash medium. Knowing that there are $2^{15}$ sectors on the medium, the media abstraction layer 606 can use 2 bytes to store the physical sector address for each logical sector address. So the master data structure is implemented as an array of 256 DWORDs (N=256), which covers the maximum quantity of logical sector addresses (e.g., 32768) to be issued by the files system. So, there are a total of 256 potential secondary data structures.

In block 2304 the secondary data structure(s) are allocated and/or maintained. First, a determination is made to calculate the smallest possible size for each potential secondary data structure. With respect to the example above and using simple division, 32768/256=128 logical sector addresses are supported by each data structure. As mentioned above, the entire physical space can be mapped using 2 bytes, b=2, therefore, each secondary data structure will be 256 bytes in size or (b=2*k=128). This will also serve as a predetermined capacity of total mappings each secondary data structure can store.

Now, knowing the size of each secondary data structure, suppose that the file system requests to write to logical sector addresses 50–79, also known as LS50-LS79. To satisfy the write requests a calculation is made that the first pointer in master data structure is used for logical sector addresses LS0-LS127 associated with a first secondary data structure which is 256 bytes in size in memory. For example, the first pointer in position zero of the master data structure 2202 shown in FIG. 22 is used to point to a secondary data structure such as secondary data structure 2204.

In block 2306, at least one counter is allocated or maintained for each secondary data structure allocated in block 2304. The counter provides an indication of when each associated secondary data structure reaches its predetermined capacity of mappings. This can be accomplished several different ways. For example, assuming the secondary data structure 2204 can map a maximum of K logical-to-physical addresses, then counter 2208 is initialized to K when the secondary data structure 2204 is allocated. Each time data is written to a new logical sector address, the count is decremented. Each time a logical sector address is no longer needed, the count is incremented.

Each time new data is added to the secondary data structure(s), in accordance with descional block 2308 the counter associated with secondary data structure to receive the new data is checked to ascertain if the counter indicates that the secondary data structure reached the predetermined capacity. For example, if the count variable for counter 2208 in FIG. 22 indicates zero, then secondary data structure 2204 has reached capacity and there is no need to search the data structure 2204 for free space to store data.

If the secondary data structure has reached its predetermined capacity as indicated by the counter 2208, then according to the Yes branch of decisional block 2308, method 2300 repeats itself, except (i) an additional pointer is activated in master data structure 2202 unless master data structure 2202 is full; (ii) an other secondary data structure is allocated, and (iii) another counter is allocated and initialized to K and monitored.

If the secondary data structure has not reached capacity as indicated by the counter, then according to the No branch of decisional block 2308, process 2300 checks whether the secondary data structure is empty according to decisional block 2310.

If according to the Yes branch of decisional block 2310, the secondary data structure is empty then process 2300 proceeds to block 2312. For example, suppose the count variable for counter 2210 in FIG. 22 equals K+1, because files or data had previously been deleted from secondary data structure 2206. Then according to block 2312, at least one secondary data structure is removed from memory creating more free space. Then, method 2300 repeats itself, except (i) a pointer is deactivated in master data structure 2202 unless there are no more secondary data structures; and (ii) the counter associated with secondary data structure that was removed is also deactivated.

If according to the No branch of decisional block 2310, the secondary data structure is not empty as indicated by the counter, then process 2300 repeats itself.

Thus, using counters in conjunction with a dynamic lookup data structure 2200 permits a file system or the like to allocate secondary data structures based on a counter variable maintained for each secondary data structure. This dramatically reduces the amount of memory required to maintain conventional bit map tables.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A system for ensuring data integrity in a flash medium, comprising:
a write pointer configured to advance through a circular sequence of memory locations in the flash medium indicating a memory location that is free to receive data as the write pointer advances; and
a power failure manager configured to store metadata in the memory location indicated by the write pointer after completion of a write operation, wherein the power failure manager is further configured to (i) search the memory location indicated by the write pointer for the metadata when the system is initialized; (ii) conclude that a power-failure event occurred if the metadata is not found; and (iii) mark the memory location indicated by the write pointer dirty.

2. The system as recited in claim 1, wherein the metadata is a bit in the memory location that is marked active at completion of the write operation.

3. The system as recited in claim 1, wherein the write pointer and power failure manager are components of a file system.

4. The system as recited in claim 1, wherein the memory locations are physical sector addresses.

5. The system as recited in claim 1, wherein the write pointer contains at least one counter that is incremented to advance the write pointer at least one memory location at a time at completion of a write operation.

6. The system as recited in claim 1, further comprising a sector manager that maintains the write pointer and provides a next memory location address to store data, upon receiving a write request.

7. A file system, comprising:
a sector manager, configured to organize a flash memory medium as if memory locations of the flash memory form a continuous circle, wherein the lowest and highest memory locations are contiguous; the sector manager comprising a write pointer that indicates a memory location that is free to receive new data, the write pointer configured to advance though the continuous circle a memory location at a time as data is written to the flash memory medium; and
a power failure manager configured to store data valid information in each memory location indicated by the write pointer at completion of writing data into each memory location, wherein the power failure manager is further configured to (i) search the memory location indicated by the write pointer for the data valid information when the file system is initialized; and (ii) mark the memory location dirty, if the data valid information is not found.

8. The file system as recited in claim 7, wherein the memory locations are physical sector addresses.

9. The file system as recited in claim 7, wherein the memory locations are physical sector addresses and the write pointer advances at least a physical sector address each time data is written on the flash memory medium.

10. The file system as recited in claim 7, wherein the sector manager contains at least one counter that is incremented to advance the write pointer from the lowest memory location to the highest memory location and repeat counting once the highest memory location is reached.

11. The file system as recited in claim 7, wherein the sector manager contains at least one counter that is decremented to advance the write pointer from the highest memory location to the lowest memory location and repeat decrementing once the lowest memory location is reached.

12. In a computer having a flash medium, a method for maintaining data integrity in the event of a power failure, comprising:
maintaining a write pointer to advance through a circular sequence of memory locations in the flash medium indicating a memory location that is available to receive data as the write pointer advances;
writing data into the memory location indicated by the write pointer;
writing metadata into the memory location indicated by the write pointer if the writing of data into the memory location is completed;
searching the memory location indicated by the write pointer to determine whether the metadata exists in the memory location upon initializing the computer; and
marking the memory location indicated by the write pointer dirty, if the metadata is does not exist in the memory location.

13. The method as recited in claim 12, further comprising:
concluding that a power-failure event occurred to the computer prior to completing the writing of data, if the metadata is not found by the searching.

14. The method as recited in claim 12, wherein the metadata is a bit in the memory location that is marked active each time writing of data into a memory location is completed and remains inactive each time the writing of data into a memory location is interrupted by a power-failure event.

15. The method as recited in claim 12, wherein the memory locations are physical sector addresses.

16. One or more computer-readable media comprising computer executable instructions that, when executed, direct a computer to:
organize a flash memory medium as if memory locations of the flash memory form a continuous circle, wherein the lowest and highest memory locations are contiguous;
maintain a write pointer to indicate a memory location that is free to receive new data, the write pointer configured to advance through the continuous circle a of memory locations as data is written to the flash memory medium; and
store meta-information in each memory location indicated by the write pointer at completion of a write operation to the memory location indicated by the write pointer;
search the memory location indicated by the write pointer when the file system is initialized to ascertain whether the meta-information exists in the memory location;
conclude that a power-failure event occurred, if the meta-information is not found in the memory location; and
mark the memory location indicated by the write pointer dirty if a power-failure event is concluded.

17. One or more computer-readable media as recited in claim 16, wherein the memory locations are physical sector addresses.

18. A computer, comprising:
one or more processors and a file system, the file system comprising: a sector manager, configured to organize a flash memory medium as if memory locations of the flash memory form a continuous circle, wherein the lowest and highest memory locations are contiguous; the sector manager comprising a write pointer that indicates a memory location that is free to receive new data, the write pointer configured to advance through the continuous circle of a memory locations as data is written on the flash memory medium; and a power failure manager configured to store a data valid bit in each memory location indicated by the write pointer at completion of writing data to the memory location indicated by the write pointer, wherein the power failure manager is further configured to (i) search the memory location indicated by the write pointer when the file system is initialized to ascertain whether the data valid bit exists in the memory location; (ii) conclude that a power-failure event occurred, if the data valid bit is not found in the memory location; and (iii) mark the memory location dirty if the power-failure event occurred.

* * * * *